United States Patent [19]
Young

[11] Patent Number: 4,882,698
[45] Date of Patent: Nov. 21, 1989

[54] CELL BASED ALU WITH TREE STRUCTURED CARRY, INVERTING LOGIC AND BALANCED LOADING

[75] Inventor: William R. Young, Palm Bay, Fla.

[73] Assignee: Harris Corporation, Melbourne, Fla.

[21] Appl. No.: 106,071

[22] Filed: Oct. 7, 1987

[51] Int. Cl.[4] .................................................. G06F 7/50
[52] U.S. Cl. ...................................... 364/736; 364/787
[58] Field of Search ................ 364/736, 787, 748, 200

[56] References Cited

U.S. PATENT DOCUMENTS 4,623,981 11/1986 Wolrich et al. ...................... 364/736

Primary Examiner—Gene Wan
Attorney, Agent, or Firm—William A. Troner; Charles C. Krawczyk; Charles E. Wands

[57] ABSTRACT

An ALU comprising a tree-based carry structure, wherein the maximum fanout from any gate in the carry structure is three. When calculating optimized fanout, it is necessary to consider input capacitance to the following stage. In minimizing propagation delay, it is necessary to consider loading and the number of stages. It has been recognized that optimum fanout of results in optimized propagation through the ALU, thus fanout of three is the closest whole number. A cell has been designed which includes the necessary and sufficient circuitry for building multicell ALU's in a highly optimized structure. The cell provides individually accessible components and dedicated components for optimum layout in the end product.

31 Claims, 16 Drawing Sheets

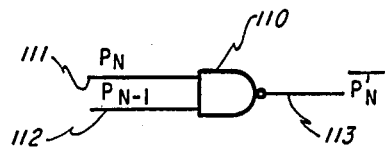
FIG. IA
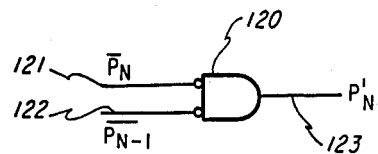
FIG. IB
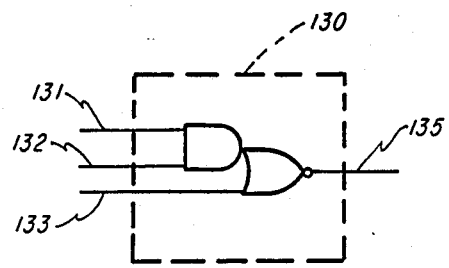
FIG. IC
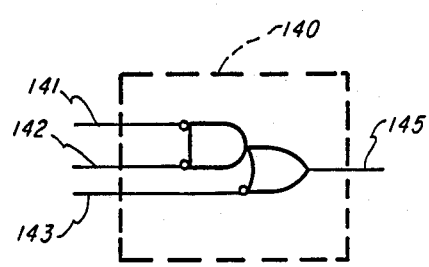
FIG. ID
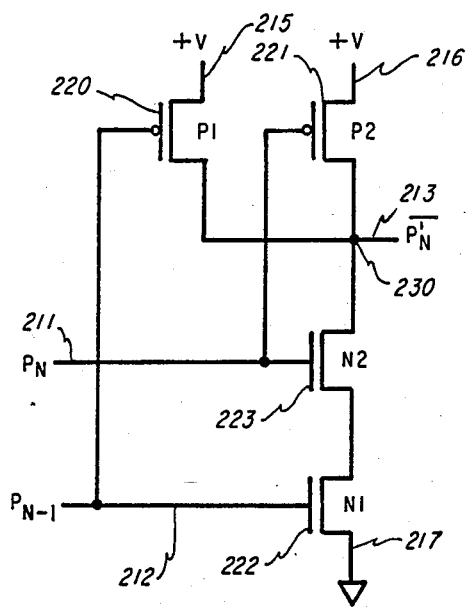
FIG. 2A
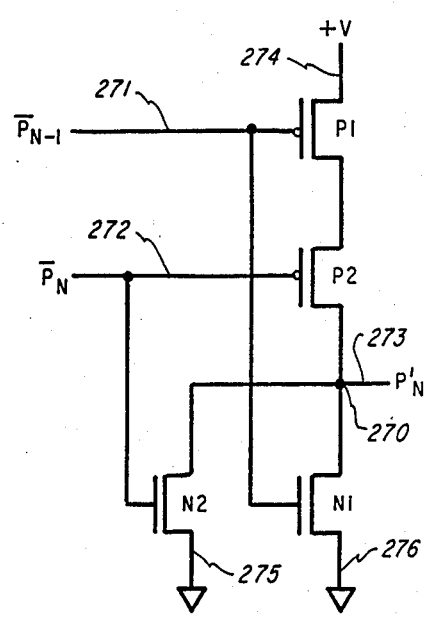
FIG. 2B

CELL BASED ALU WITH TREE STRUCTURED CARRY, INVERTING LOGIC AND BALANCED LOADING

FIELD OF THE INVENTION

The present invention relates generally to an Arithmetic Logic Unit, ALU, for use in microprocessors. More specifically, the invention relates to a cell based implementation of a fast ALU including tree structured carry, inverting logic and balanced loading.

BACKGROUND AND SUMMARY OF THE INVENTION

In the design of microprocessors, it has generally been desirable to provide fast and low powered operation. One manner of providing a fast ALU is providing a tree structure for carry generation which results in a carry propagation delay proportional to log (N), where (N) is the number of bits in the ALU. The base for the log is the number of bits being combined at each node in the tree. For example, if two bits are combined at each node in the tree and it is a 16-bit processor, then the propagation delay through the ALU is proportional to $\log_2 (16)$ which equals 4.

An example of a tree structure for carry generation is provided in "Digital CMOS Circuit Design", by Marco Annaratone, pages 204–209, at page 207 where FIG. 6-34 illustrates an internal cell having a tree structure for carry generation. The equation at page 207 of the above article illustrates that noninverting logic is to be utilized. Also, the tree structure illustrated provides fanout at least as high as five for a 16-bit ALU.

Another known ALU scheme is disclosed in U.S. Pat. No. 4,559,608. This patent relates to a CMOS ALU and discloses a look ahead carry circuit using inverting logic.

The present invention provides a full function ALU having the capability of performing the logical functions of one or more input variables on a bit-by-bit basis and of providing sum and difference of the inputs with or without a carry-in or borrow-in. Table 1 illustrates the defined logical and arithmetic functions for implementation of the ALU for two input variables. Other combinations of K and L terms and carry-in are possible depending upon the needs of the user.

TABLE 1

| K₃ | K₂ | K₁ | K₀ | L₂ | L₁ | L₀ | CIN | P | G | S | FUNCTION |
|---|---|---|---|---|---|---|---|---|---|---|---|
| 0 | 0 | 0 | 0 | 0 | 0 | 0 | 0 | 0 | 0 | 0 | Logical (0) |
| 0 | 0 | 0 | 1 | 0 | 0 | 0 | 0 | A$\underline{B}$ | 0 | A$\underline{B}$ | Logical (A AND $\underline{B}$) |
| 0 | 0 | 1 | 0 | 0 | 0 | 0 | 0 | $\underline{A}$B | 0 | $\underline{A}$B | Logical ($\underline{A}$ AND B) |
| 0 | 0 | 1 | 1 | 0 | 0 | 0 | 0 | $\underline{A}$ | 0 | $\underline{A}$ | Logical ($\underline{A}$) |
| 0 | 1 | 0 | 0 | 0 | 0 | 0 | 0 | AB | 0 | AB | Logical (A AND B) |
| 1 | 0 | 1 | 0 | 0 | 0 | 0 | 0 | B | 0 | B | Logical (B) |
| 0 | 1 | 1 | 0 | 0 | 0 | 0 | 0 | A XOR B | 0 | A XOR B | Logical (A EXCLUSIVE OR B) |
| 0 | 1 | 1 | 1 | 0 | 0 | 0 | 0 | $\underline{A}$ OR B | 0 | $\underline{A}$ OR B | Logical ($\underline{A}$ OR B) |
| 1 | 0 | 0 | 0 | 0 | 0 | 0 | 0 | $\overline{AB}$ | 0 | $\overline{AB}$ | Logical ($\overline{A \text{ AND } B}$) or (A NOR B) |
| 1 | 0 | 0 | 1 | 0 | 0 | 0 | 0 | A XNOR B | 0 | A XNOR B | Logical (A EXCLUSIVE NOR B) |
| 1 | 0 | 1 | 0 | 0 | 0 | 0 | 0 | $\overline{B}$ | 0 | $\overline{B}$ | Logical ($\overline{B}$) |
| 1 | 0 | 1 | 1 | 0 | 0 | 0 | 0 | A OR $\overline{B}$ | 0 | A OR $\overline{B}$ | Logical A OR $\overline{B}$) |
| 1 | 1 | 0 | 0 | 0 | 0 | 0 | 0 | $\overline{A}$ | 0 | $\overline{A}$ | Logical ($\overline{A}$) |
| 1 | 1 | 0 | 1 | 0 | 0 | 0 | 0 | $\overline{A}$ OR B | 0 | $\overline{A}$ OR $\underline{B}$ | Logical ($\overline{A}$ OR $\underline{B}$) |
| 1 | 1 | 1 | 0 | 0 | 0 | 0 | 0 | $\overline{A}$ OR $\overline{B}$ | 0 | $\overline{A}$ OR $\overline{B}$ | Logical ($\overline{A}$ OR $\overline{B}$) OR (A NAND B) |
| 1 | 1 | 1 | 1 | 0 | 0 | 0 | 0 | 1 | 0 | 1 | Logical (1) |
| 0 | 1 | 1 | 0 | 0 | 0 | 1 | 0 | A XOR B | AB | A + B | Sum (A plus B) |
| 0 | 1 | 1 | 0 | 0 | 0 | 1 | 1 | A XOR B | A$\underline{B}$ | A + B + $C_{IN}$ | Sum (A plus B plus CARRY IN) |
| 1 | 0 | 0 | 1 | 0 | 1 | 0 | 1 | A XNOR B | A$\underline{B}$ | A − B | Difference (A minus B) |
| 1 | 0 | 0 | 1 | 0 | 1 | 0 | 0 | A XNOR B | A$\overline{B}$ | A − B − $C_{IN}$ | Difference (A minus B minus BORROW IN) |
| 1 | 0 | 0 | 1 | 1 | 0 | 0 | 1 | A XNOR B | $\overline{A}$B | B− A | Difference (B minus A) |
| 1 | 0 | 0 | 1 | 1 | 0 | 0 | 0 | A XNOR B | $\underline{A}$B | B− A− $C_{IN}$ | Difference (B minus A minus BORROW IN) |

In the description of the invention it will be convenient to refer to various variables which are generally used in reference to ALU design and functioning. These commonly used terms are defined as follows: Arithmetic Operations:

$S_N$ = Sum from $N^{th}$ bit
$C_{N-1}$ = Carry into the $N^{th}$ bit
$C_N$ = Carry from $N^{th}$ bit
$A_N$ = A input to the $N^{th}$ bit
$P_N$ = Propagate term of the $N^{th}$ bit
$B_N$ = B input to the $N^{th}$ bit
$G_N$ = Generate term of the $N^{th}$ bit The benefits of the invention may be readily illustrated with respect to an operation where:

$S_N = A_N$ XOR $B_N$ XOR $C_{N-1}$
$C_N = G_N$ OR $P_N C_{N-1}$
$G_N = A_N B_N$

To better understand the operation of the ALU of the present invention, please consider that $G_N$ is a term in which a carry is generated independent of carry-in. $P_N$ is a term which causes the carry-in to be propagated to the next bit position. Therefore, there are two possible implementations for $P_N$, i.e., (1) $P_N = A_N$ OR $B_N$ (OR represents the INCLUSIVE OR function)

(2) $P_N = A_N$ XOR $B_N$ (XOR represents the EXCLUSIVE OR function)

The first implementation can generally cause $P_N$ to be generated faster than in the second implementation but the first implementation cannot be used to directly generate the sum $S_N$. The second implementation generates a $P_N$ which can be used both to generate $C_N$ and $S_N$ directly, since:

$S_N = A_N$ XOR $B_N$ XOR $C_{N-1}$ $S_N = P_N$ XOR $C_{N-1}$

Therefore:

$P_N = A_N$ XOR $B_N$ $$G_N = A_N B_N$$

$$C_N = G_N \text{ OR } P_N C_{N-1}$$

$$S_N = P_N \text{ XOR } C_{N-1}$$

Once these terms have been derived, the carry propagation is performed. There are three generally recognized methods of propagating the carry:
(1) Ripple Carry
(2) Look Ahead Carry
(3) Tree Structured Carry In ripple carry, a carry generated in the least significant bit and is serially propagated to each higher order bit. The total delay (tp) is generally:

$$t_P = K_1 + n K_2$$

Where $K_1$ and $K_2$ are constants and n is the number of bits. Thus, the propagation of the carry through the carry propagation circuitry is proportional to the number of bits (n).

In look ahead carry, a carry generated from an m-bit group of bits is then serially propagated to each higher bit group by skipping over bits in groups of m bits. The total propagation delay is generally of the form:

$$t_P = K_1 + n/m \, K_2$$

Where m is the number of bits per group. Here too, the propagation through the carry propagation circuitry is proportional to the number of bits (n).

The tree structure computes carrys by combining carrys in groups of m bits, groups are combined from the least to most significant bit until a particular bit position's carry is computed. All carrys are computed in parallel. The general form of the propagation delay is:

$$t_p = K_1 + K_2 \log_m(n)$$

This implementation generally requires the most hardware but gives the fastest results because the delay grows as $\log_m(n)$ rather than being proportional to n as in ripple carry and look ahead carry. It should be noted that the constants for ripple carry, look ahead carry and the structured carry are not necessarily the same.

A tree structure ALU generates all propagate and generate terms in parallel then combines the propagate and generate terms of bit position N with lower order bits to form the complete carry term $C_N$.

An analysis of the logic functions needed to derive CN is shown below:

$$C_N = G_N \text{ OR } P_N(C_{N-1})$$

However, $C_{N-1}$ must also be considered, so:

$$C_N = G_N \text{ OR } P_N(G_{N-1} \text{ OR } P_{N-1}(G_{N-2} \text{ OR } P_{N-2}(G_{N-3} \ldots (G_0 \text{ OR } P_0 C_{IN})) \ldots))$$

Expanding again reveals:

$$C_N = G_N \text{ OR } P_N G_{N-1} \text{ OR } P_N P_{N-1} G_{N-2} \text{ OR } P_N P_{N-1} P_{N-2} G_{N-3} \text{ OR } \ldots P_N \ldots P_1 G_0 \text{ OR } P_N \ldots P_0 C_{IN}$$

Two bit positions' propagate and generate terms can be combined as follows:

$$P_N' = P_N P_{N-1}$$

$$G_N' = G_N \text{ OR } P_N G_{N-1}$$

The $G_N'$ terms are important in the carry portion of the ALU and are generated in complex gates. Since the complex gates which are used in the implementation of the carry circuitry as well as the P and G generate circuit and output circuit involve the execution of multiple logical combinations in a single gate, shorthand notations for these gates are conveniently used to identify their functions. For instance, the gates shown in FIGS. 1C (AND/NOR) and 1D (OR/NAND) are used in the carry circuitry as the logical elements which make up the tree structure. Since it will be necessary to identify the various inputs to these complex gates, reference will be made to the AND inputs xxx and the NOR input xxx of the AND/NOR gates and to the OR inputs xxx and the NAND input xxx of the OR/NAND gates, as shown in FIGS. 1C and 1D. Alternatively, the signals provided to the inputs will merely be referred to as the input P and G terms or P and G signals. Figures 1A-1D illustrate various logic symbols for gates and FIGS. 2A-2F illustrate various implementations of these gates.

According to the present invention, an ALU can be designed from a repeatable cell which contains the necessary components for a given number of bits of the ALU. Thus, if the cell contains the necessary circuitry for two bits of the ALU, a 32-bit ALU can be built by providing 16 repeats of the cell and providing the appropriate interconnections.

In order to simplify the cell yet insure that all necessary components are included, it is necessary to provide not only the logic gates needed for the specific tasks of the manipulation of a single bit (or two bits in a two bit arrangement) but also to provide the circuitry needed to interconnect adjacent cells.

It is an object of the present invention to provide an Arithmetic Logic Unit with reduced delay.

It is another object of the invention to provide a cell based ALU design which includes minimum excess circuitry.

It is still another object of the invention to provide a cell design for an ALU which contains all the circuitry necessary for fabrication of an ALU without additional circuitry.

It is yet another object of the invention to provide a cell layout which provides a minimum number of levels of devices in the physical structure of the ALU formed by use of the cell.

It is a still further object of the invention to provide a cell design which is compatible with an ALU design technique having minimum propagation delay as a feature of the ALU.

Another object of the invention is the provision of a cell based ALU having a tree-based carry portion with inverting logic and fanout limited to a specific design factor for optimizing throughput.

These and other objects of the invention are attained by providing a cell structure having a propagate and generate portion, a carry portion and an output portion.

The propagate and generate portion of the invention provides P and G terms to the carry and output portions and the carry portion provides a carry term to the output portion. In one implementation, the carry and output portions are combined while in a more generic approach, the carry portion is separate from the output portion.

The carry portion of the cell includes a number of gates which have their inputs and outputs individually accessible during the design stages in order that these inputs and outputs may be selected to perform needed functions in the ALU or may be left unused in the ALU, depending upon the location of the cell in the ALU design. The provision of the individually accessible gates in the cell design provides a smaller cell design than could be previously provided by ALU building blocks which did not contain the individually accessible gates.

One aspect of the invention involves the provision of a carry portion which has a plurality of inverters which are totally individually accessible, as well as the provision of at least one totally individually accessible complex logic gate. A cell having these individually accessible components can be utilized in a flexible configuration such that the identical cell can be used to implement the circuitry for the bits at any location in an ALU.

The use of a complex AND/NOR gate and a complex OR/NAND gate in the carry portion of the cell in combination with a plurality of inverters and at least one NOR and one NAND gate provides a cell having the necessary circuitry for a 1-bit cell which can be repeated for each bit of an ALU of virtually unlimited bit length. In this version of the cell, it may be desirable to leave each input and each output of the components unconnected in order that the designer can provide the proper interconnection of the cell's components for the particular location of the cell in the ALU. It is to be noted that the interconnection of the components will vary as the cell is used at different locations in the ALU.

The present invention is suitable for use with either inverting or noninverting logic but is ideally suited for use with inverting logic such as is involved in the design of CMOS microprocessors. Thus, another feature of the invention is its provision of the means for designing an ALU where each level of logic is inverted with respect to the preceding level, even for those signals which have not been inverted by a logical operation. This is the reason for the provision of the inverters in the carry portion of the circuitry. Another aspect of the invention is the provision of the means for keeping the maximum fanout from any gate to a manageable limit. The inverters which are used for obtaining proper logic inversions are conveniently used for a separate and unrelated purpose of driving multiple gates in cases where fanout from the preceding gate would otherwise be potentially excessive. This provides a substantial speed advantage over ALU designs where excessive fanout is present. According to the present invention, ALU's of any arbitrary bit length may be fabricated without exceeding a fanout of three in the carry circuitry.

It is intended that the present invention will be implemented in many alternative manners all of which will be based on the general principle that a simple cell containing the necessary components for fabricating a multicell ALU can be designed with certain dedicated interconnections of the components in the cell and with various components of the cell left unconnected until the ALU design is assembled, at which time the cell's individually accessible inputs and outputs can be interconnected, as necessary, for the optimization of the ALU design. For purposes of this description, individually accessible means that there is an input or output to a gate which is not connected to any other component in the cell design until a multicell ALU is designed. The provision of the cell with the necessary building blocks and the flexibility to use the building blocks in a wide variety of manners without the constraints imposed by preconnecting the individually accessible components results in a substantial savings of time and effort in ALU design and fabrication. Referring to FIG. 8, it can be seen that OR/NAND gate $G_{33}$ has each of its inputs 846, 847 and 848, as well as its output 849, individually accessible. This is an isolated individually accessible gate which will provide great flexibility in the design of ALU's having any multiple of cell repeats. For purposes of this description, a gate such as this which has none of its inputs or outputs preconnected is referred to as totally individually accessible. Signals are equivalently referred to as $\overline{X}$ or XBAR in this description.

Other objects, advantages and novel features of the invention are described herein with respect to the various specific implementations of the invention.

BRIEF DESCRIPTION OF THE DRAWINGS

FIGS. 1A-1D illustrate logic sumbols for combining generate and propagate terms.

FIGS. 2A-2F illustrate circuit implementations of the logic symbols of FIGS. 1A-1D.

DETAILED DESCRIPTION OF THE DRAWINGS

Figure 2C:
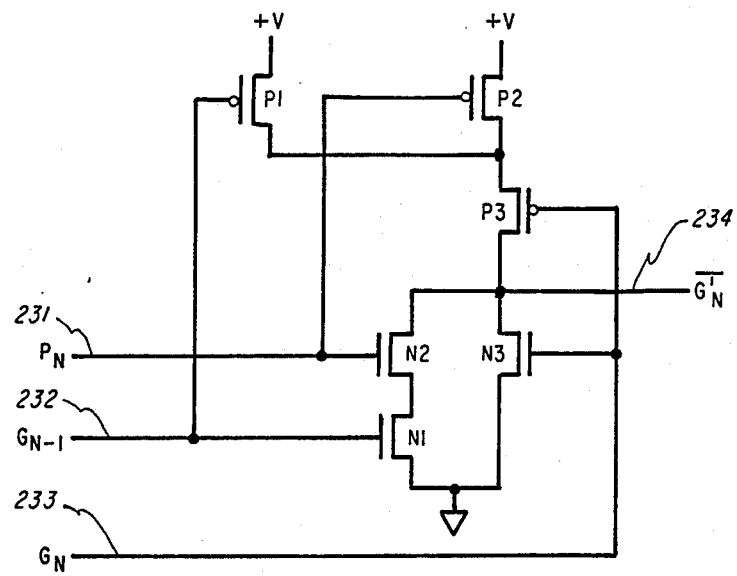

Two bit positions'propagate and generate terms can be combined as follows:

$P_N' = P_N P_{N-1}$ $G_N' = G_N \text{ OR } P_N G_{N-1}$

Referring to the figures, FIGS. 1A through 1D illustrate inverting logic schematics for providing the generated and propagated carry bits $P_N'$ and $G_N'$. FIG. 1A illustrates that $P_N$ and $P_{N-1}$ are combined in NAND gate 110 in order to yield $P_N'$BAR. In FIG. 1B, $P_N$BAR and $P_{N-1}$BAR are combined in NOR gate 120 to provide $P_N'$. Inverting logic implementations of P and G generation are particularly suited for CMOS applications.

FIG. 1A includes first and second NAND inputs 111, 112 which are provided to NAND gate 110. The output 113 is illustrated as providing output signal $P_N'$BAR. $P_N'$BAR is defined as being the logical NAND of $P_N$ and $P_{N-1}$.

FIG. 1B illustrates NOR gate 120 having NOR inputs 121, 122 and a NOR output 123. FIG. 1B illustrates input signals $P_N$BAR and $P_{N-1}$BAR which results in the defined output $P_N'$.

FIG. 1C shows the circuitry for generation of $G_N'$BAR at the output 135 of complex AND/NOR gate 130, where $G_N$ is provided to the NOR input 133 and $G_{N-1}$ and $P_N$ are provided to the AND inputs 131, 132 of gate 130.

FIG. 1D shows OR inputs 141 and 142 for receiving input signals $G_{N-1}$BAR and $P_N$BAR of complex OR/NAND gate 140, where input signal $G_N$BAR is provided to the NAND input 143. The output 145 of gate 140 provides $G_N'$ as an output signal. The implementations shown in FIGS. 1C and 1D are also for inverting logic such as is encountered in CMOS circuitry. It is to be appreciated that noninverting logic could be utilized to provide $P_N'$ and $G_N'$.

FIGS. 1A-1D illustrate inverting logic symbols for these combinations and suitable CMOS circuit implementations for this logic are shown in FIGS. 2A-2F. FIG. 2A illustrates the circuitry which will expeditiously implement the logic of logic schematic IA. Inputs 211 and 212 receive input signals $P_N$ and $P_{N-1}$, respectively, to provide $P_N'$BAR at output 213. This is implemented by providing a first PMOS and NMOS transistor pair comprising $P_1$ and $N_1$, 220 and 222 each having gates to which input signal $P_{N-1}$ is provided. Transistors $P_2$ and $N_2$, 221, 223 have gates to which input signal $P_N$ is provided. Output 213 is connected to the parallel connection of $P_1$ and $P_2$ at node 230 where series connected $N_1$ and $N_2$ are connected. Thus, $P_1$ and $P_2$ are connected in parallel between the positive voltage supply 215, 216 and node 230. N channel devices $N_1$ and $N_2$ are connected in series between node 230 and ground 217.

FIG. 2B illustrates a circuit implementation for the logic schematic of FIG. 1B. Inputs 271, 272, respectively, receive input signals $P_{N-1}$BAR and $P_N$BAR in order to provide output signal $P_N'$ at output 273. This logic function is implemented by providing PMOS transistors $P_1$ and $P_2$ in series between voltage supply 274 and node 270. NMOS transistors $N_1$ and $N_2$ are connected in parallel between node 270 and ground 275, 276. Output 273 is provided from node 270.

Figure 2D:
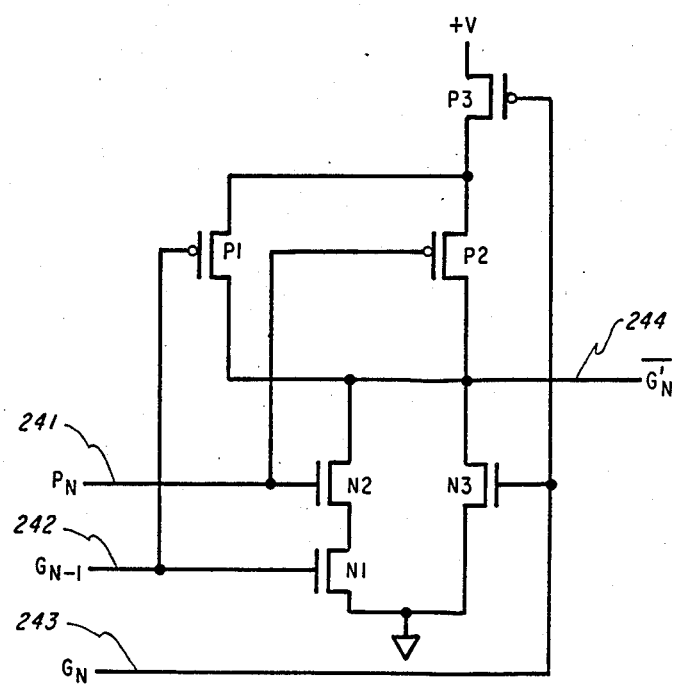

FIGS. 2C and 2D illustrate alternative circuit implementations capable of implementing the logic of the logic symbol of FIG. 1C. In FIG. 2C inputs 231 and 232, respectively, receive input signals $P_N$ and $G_{N-1}$, while input 233 receives input signal $G_N$. Output 234 provides output signal $G_N'$BAR. FIG. 2D illustrates an alternative implementation where input 241 receives input signal $P_N$, input 242 receives input signal $G_{N-1}$, and input 243 receives input signal $G_N$. Output signal $G_N'$BAR is provided at output 244.

Figure 2E:
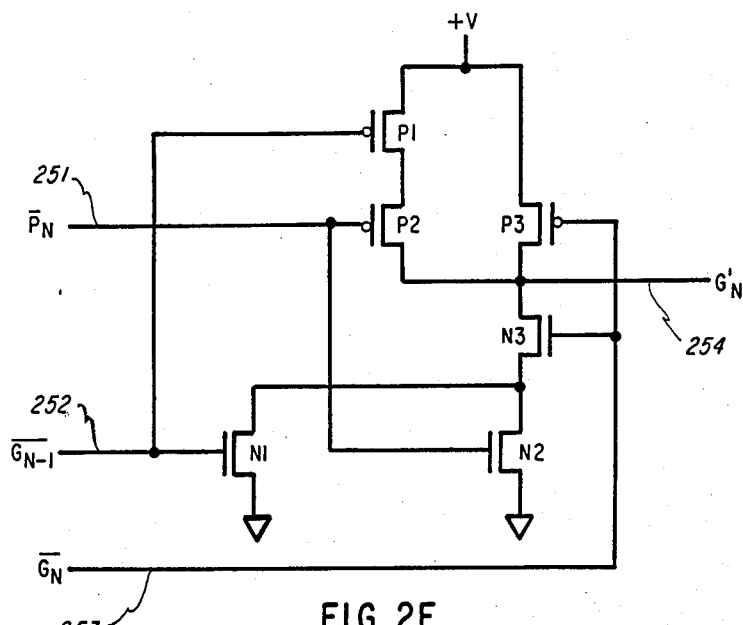
Figure 2F:
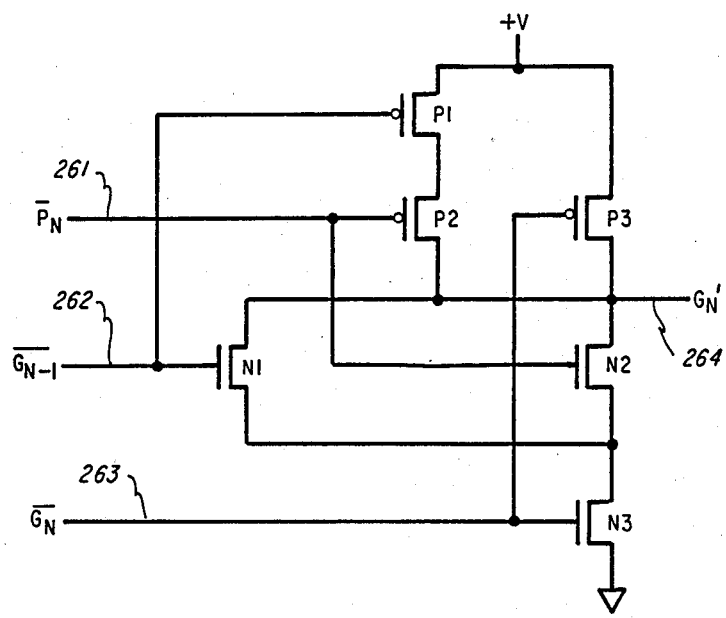

Finally, FIGS. 2E and 2F illustrate alternative circuitry capable of implementing the logic schematic of FIG. 1D. In FIG. 2E input signal $P_N$BAR is provided to input 251, while input signals $G_{N-1}$BAR and $G_N$BAR are provided, respectively, to inputs 252 and 253. At output 254, output signal $G_N'$ is provided. FIG. 2F shows an alternative implementation for providing output $G_N'$ at output 264. Input 261 receives input signal $P_N$BAR, while input 262 receives input signal $G_{N-1}$BAR. Input 263 receives input signal $G_N$BAR.

Figure 3A:
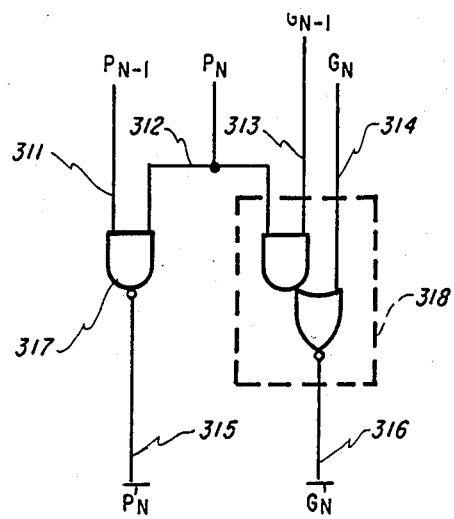
FIGS. 3A and 3B illustrate logic schematics for combining generate and propagate terms in a carry-tree gate.
Figure 3C:
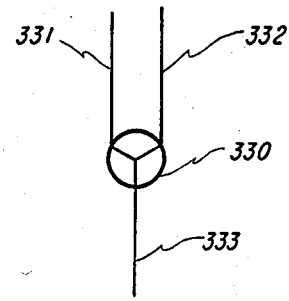
FIG. 3C is a carry-tree gate symbol.
Figure 3B:
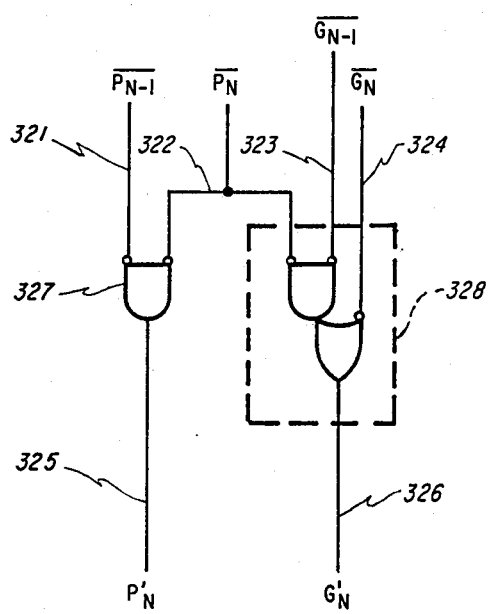

FIGS. 3A and 3B illustrate logic schematics for providing $P_N'$BAR, $G_N'$BAR and $P_N'$, $G_N'$, respectively. $P_N'$BAR and $G_N'$BAR are provided by the integrated circuit arrangement of FIG. 3A, where NAND gate 317 receives at its inputs 311, 312 input signals $P_{N-1}$ and $P_N$, respectively. Complex gate 318 receives at its AND inputs 312, 313 input signals $P_N$ and $G_{N-1}$, respectively, while input signal $G_N$ is provided to NOR input 314. Output 316 provides output signal $G_N'$BAR. FIG. 3B shows the inverse function for providing $P_N'$ and $G_N'$ rather than $P_N'$BAR and $G_N'$BAR, as shown in FIG. 3A. In FIG. 3B, NOR inputs 321 and 322 receive as input signals $P_{N-1}$BAR and $P_N$BAR, respectively, so that NOR gate 327 will provide $P_N'$ at output 325. OR/NAND gate 328 receives input signals $P_N$BAR and $G_{N-1}$BAR at its OR inputs 322, 323, respectively, and receives input signal $G_N$BAR at its NAND input 324 to provide output signal $G_N'$ at output 326. For simplicity in the drawings, the circuitry which implements these logic functions will be described by the shorthand notation "carry-tree gate" which is illustrated in FIG. 3C. The illustration shown in FIG. 3C is used to represent the appropriate one of the circuit functions provided by the logic schematics shown in FIGS. 3A and 3B, respectively. The inputs 331 and 332 in FIG. 3C represent terminals 311, 312, 313 and 314 illustrated in FIG. 3A or, alternatively, terminals 321, 322, 323 and 324 represented in FIG. 3B. In either event, inputs 331 and 332 in FIG. 3C receive P and G terms for bits N−1 and N. Output 333 in FIG. 3C represent terminals 315 and 316 of FIG. 3A or outputs 325 and 326 of FIG. 3B. In either event, output 333 in FIG. 3C provides $P_N'$ and $G_N'$ terms.

Figure 3D:
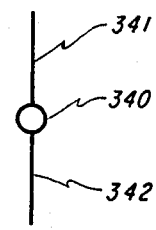
FIG. 3D is a symbol representing the circuitry which inverts a group of signals.

FIG. 3D is a shortened notation for inverters which are used in the illustrations in the present application for convenience. Input 341 provides a pair of given signals to inverter 340 which provides the inverse of the input signals at the output terminal 342. Additionally, FIG. 3D is a shortened notation for an inverter pair.

Figure 4:
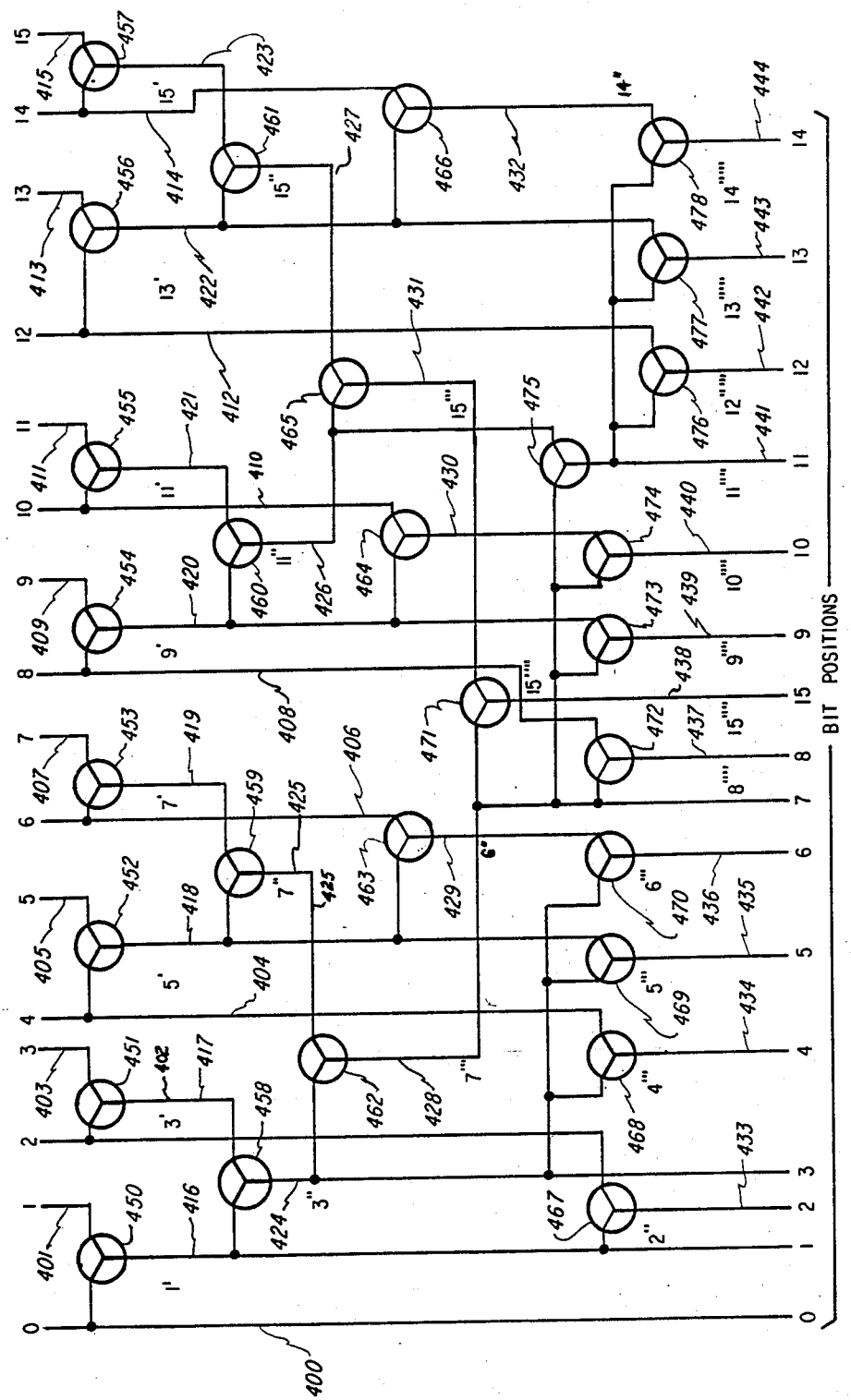
FIG. 4 illustrates a carry-tree structure for a 16-bit ALU.

FIG. 4 illustrates a logic implementation of the carry propagate portion of an ALU. The inputs 400, 401 through 415 are each adapted to receive the respective P and G terms provided from the P and G generate portion of the ALU. Thus, input 400 will receive a P and a G term. Similarly, input 401 will receive a P and a G term from the next higher order bit. Thus, assuming that $P_0$ and $G_0$ are provided to input 400, then $P_1$ and $G_1$ will be provided to input 401. Then, $P_1'$BAR and $G_1'$BAR will be provided on output line 416. In similar fashion, inputs 402 and 403 will receive P and G terms at inputs 402 and 403, providing $P_3'$BAR and $G_3'$BAR terms on line 417. Carry-tree gate 458 will receive at its input lines 416 and 417 the $P_1'$BAR, $P_3'$BAR, $G_1'$BAR and $G_3'$BAR terms to provide $P_3''$ and $G_3''$ prime terms at output line 424. Since the signals provided on each of lines 416 and 417 have each traversed a single carry-tree gate, 450, 451, respectively, the P' and G' terms are both BARRED terms. Thus, the sense of the logic is correct as it enters carry-tree gate 458. Similarly, the sense of the input signals provided to carry-tree gate 459 are also of proper sense, since lines 418 and 419 carry P' and G' terms which have traversed single carry-tree gates 452 and 453, respectively. Thus, the inputs to carry-tree gates 458 and 459 are both odd for each carry-tree gate. Carry-tree gate 462 receives inputs from lines 424 and 425 which have each traversed an even (2) number of prior carry-tree gates. Thus, the structural implementation of carry-tree gate 462 may be identical to that of carry-tree gates 450, 451, 452, . . . 457. These may be, for instance, an implementation as shown in FIG. 3A. Carry-tree gates 458, 459, 460 and 461 will be the inverse carry-tree gates illustrated in FIG. 3B. The next level of logic 462 and 465 is again of the form of implementation illustrated in FIG. 3A. However, for purposes of illustration, carry-tree gate 469 is seen to include input line 418 and input line 424. The P and G terms present on line 424 have traversed two carry-tree gates, i.e. 450, 458, while the P and G terms on line 418 have traversed only carry-tree gate 452. Thus, gate 469 will be receiving P and G terms of opposite sense. This would result in the need to provide a third type of carry-tree gate capable of receiving for instance $P_{N-1}$ and $G_{N-1}$ terms and combining them with $P_N$BAR and $G_N$BAR terms.

In optimizing circuit design for inverting logic requires that all the inputs to the carry-tree gates be of the same sense. Thus, it can be seen that FIG. 4 requires the use of a different form of logic such as a noninverting logic form of carry-tree gates and thus is not optimized for providing a carry-tree structure using inverting logic. As the tree structure in FIG. 4 is further analyzed, it can be seen, for instance, that carry-tree gate 471 receives its inputs from lines 428 and 431 in the proper sense and provides its outputs at output 438. Carry-tree gate 468 receives its inputs in the proper sense because the input from 404 has no inverting carry-tree gates in its path, while input from line 424 is inverted twice, due to traversing two carry-tree gates in its path. Thus, the output provided at output 434 is of the proper sense. However, outputs 433, 435, 437, 440, 441, 442, 443 and 444 all have outputs which have traversed at least one carry-tree gate where the sense was improper, that is one odd number of carry-tree gates traversed and one even number of carry-tree gates traversed.

Figure 7:
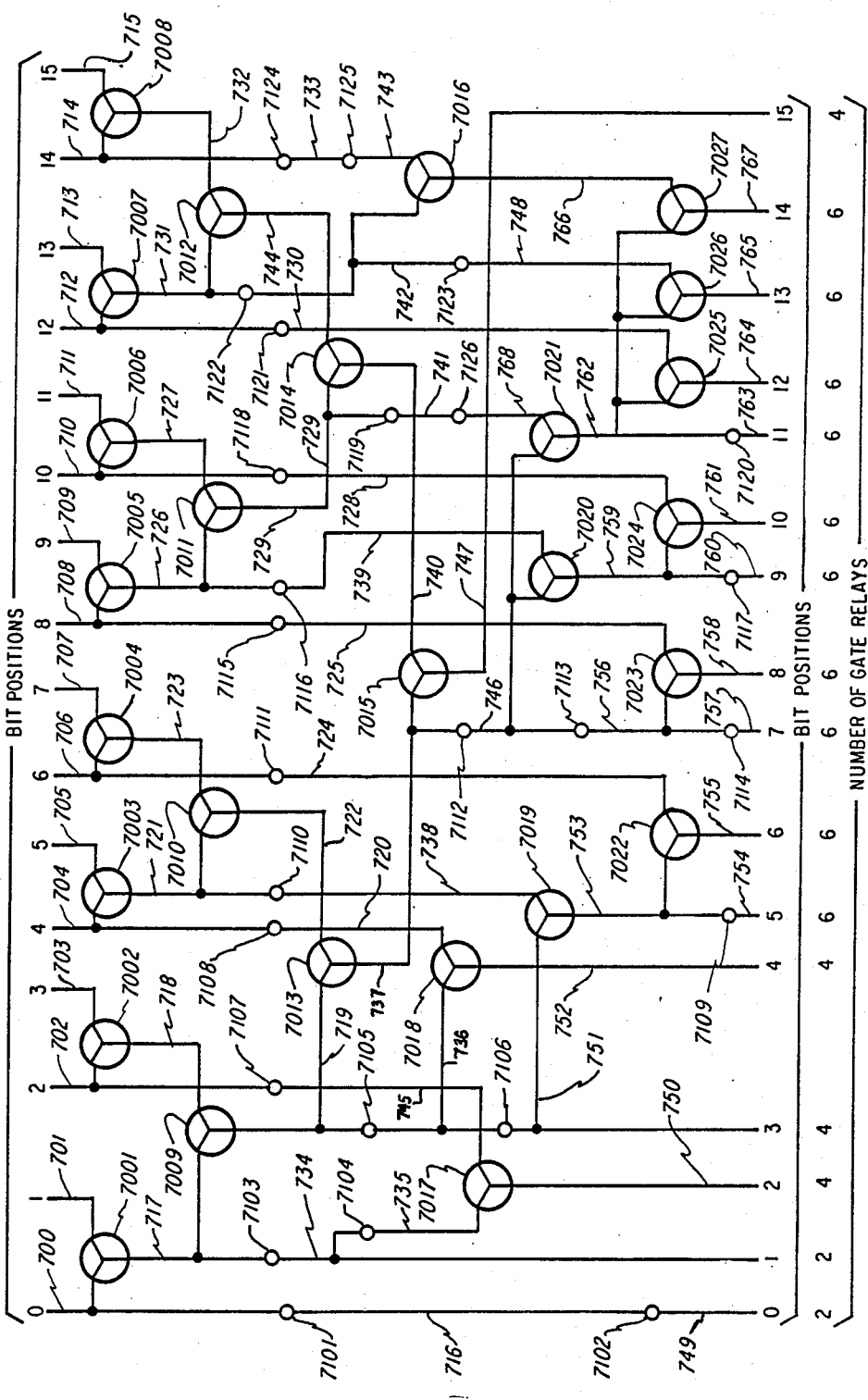
FIG. 7 illustrates a carry-tree structure for a 16-bit ALU, where every node receives all of its inputs with either all odd or all even number of levels of gates.

It has been found that the provision of inverters can provide the additional levels of logic needed to insure that each of the inputs to a logic element have traversed either an even or an odd number of preceding levels. FIG. 7 demonstrates the use of inverters to solve the problem of improper sense of the signals in a tree structured carry using inverting logic arrangement.

Another important factor in ALU design relates to the loading of the nodes in the ALU carry array. Referring to FIG. 4, it can be seen that the fanout of the carry-tree gates vary from a low of a fanout of one for, inter alia, lead 417, to a high of six, five carry-tree gates plus the output load, for lead 428 which is the output from carry-tree gate 462. Additionally, the provision of inverters will allow for the minimization of loading on the most heavily loaded nodes, as explained with respect to FIG. 7.

Figure 5:
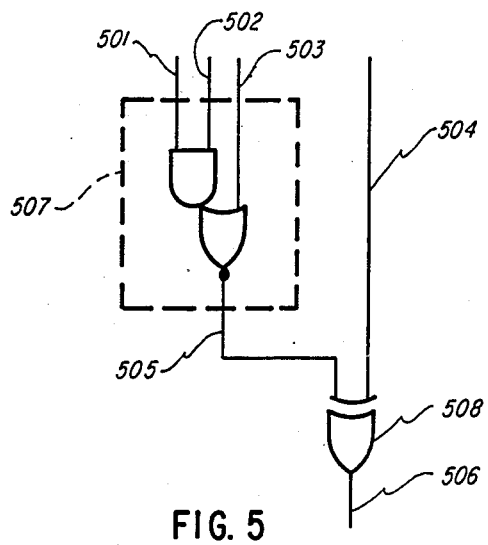
FIG. 5 illustrates a logic schematic for providing sum bits.

FIG. 5 illustrates an inverting logic schematic for implementing the logic functions which are useful in providing output signals from the ALU. AND/NOR gate 507 has AND inputs 501 and 502 for receiving $C_{IN}$ and $P_{N-1}'$ input signals, and NOR input 503 for receiving the $G_{N-1}'$ input signal. The output 505 from gate 507 provides $C_{N-1}$BAR as an output signal. The output signal $S_N$ is obtained at the output 506 of EXCLUSIVE OR gate 508 when the inputs 504, 505 have $P_N$BAR and $C_{N-1}$BAR signals, respectively. The following equations are implemented by the circuit of FIG. 5:

$$C_{N-1}\text{BAR} = G_{N-1}' \text{ NOR } P_{N-1}'C_{IN}$$

$$S_N = P_N\text{BAR XOR } C_{N-1}\text{BAR}$$

Figure 6:
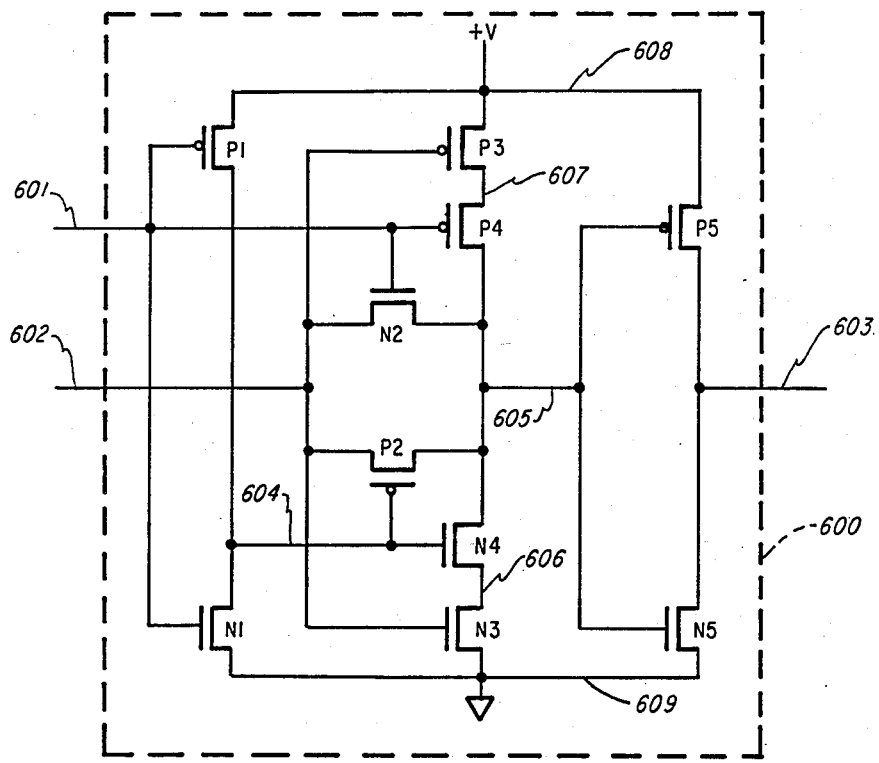
FIG. 6 illustrates a circuit implementation of an EXCLUSIVE OR function.

It is noted that $P_N$BAR is available prior to the availability of $C_{N-1}$BAR due to the propagation delays involved in the generation of $C_{N-1}$BAR. Thus, the circuit implementation of FIG. 6 may be employed to perform the EXCLUSIVE OR function and also to provide a buffered output. This implementation minimizes the delay from $C_{N-1}$BAR to $S_N$. This is the time required for the signals to get from input 602 to output 603 of FIG. 6.

Input 601 to EXCLUSIVE OR circuit 600 provides an input signal to the gates of P channel devices $P_1$ and $P_4$ and to the gates of N channel devices $N_1$ and $N_2$. The input signal provided to input 602 is provided to the gates of P channel device $P_3$ and N channel device $N_3$. Additionally, the signal provided to input 602 is provided to the sources of devices $P_2$ and $N_2$. It is noted that, while sources used here to denote one of the source or drain regions of devices $N_2$ and $P_2$, it would be equally feasible to have the input 602 connected to the drains of these respective devices or the source of one and drain of the other of these devices. The significant feature being that it is connected to one end of the device, while the other end of each of devices $N_2$ and $P_2$ is connected to node 605. It is additionally noted that P channel devices $P_3$ and $P_4$ are series connected between the voltage supply 608 and node 605, while N channel devices $N_3$ and $N_4$ are connected in series between node 605 and ground 609. It is also noted that inverter devices $P_1$ and $N_1$ are series connected between the voltage supply and ground. The output of inverter $P_1$ and $N_1$ drains, 604, drive the gates of transistors $P_2$ and $N_4$. Two additional devices, output inverter $P_5$ and $N_5$, are provided series connected between the voltage supply and ground and having their gates connected to node 605 and their drains connect to output 603. Output 603 of EXCLUSIVE OR gate 600 is connected at the series connection of devices $P_5$ and $N_5$.

FIG. 7 illustrates an embodiment of the carry logic arrangement of FIG. 4 which has been modified to provide inverters as needed to insure that the inputs to each node of the array have traversed either both an odd or both an even number of logic levels. An inverter will be considered to be a level of logic for purposes of this description, since it will invert the sense of the signal just as will occur at each carry-tree gate. As can be seen in FIG. 7, the maximum number of logic levels which is encountered is six. The use of inverters provides dual functions in the arrangement of FIG. 7, including the minimization of loading on the nodes of the network and the provision of an appropriate number of inversions to permit use of inverting logic such as is encountered in CMOS.

Referring to FIG. 7 which includes 16 inputs, 700 through 715, each of which inputs carries P and G terms from respective bit positions, and carry-tree gates 7001 through 7027. Carry-tree gates 7001 through 7008 receive the P and G terms from inputs 700 through 715 and provide P' and G' terms on lines 717, 718, 721, 723, 726, 727, 731 and 732. Each of these P' and G' terms has traversed a single carry-tree gate and hence has its polarity inverted relative to the logic levels provided at inputs 700 through 715. Carry-tree gate 7009 through 7012 receive the P' and G' terms and provide P" and G" terms on lines 719, 722, 729 and 744. P" and G" signals provided to carry-tree gates 713 and 714 are combined to form P''' and G''' terms which terms themselves are combined in carry-tree gate 7015 to form P'''' and G'''' terms on line 747 which provides its output at the most significant bit output location. Carry-tree gate 7016 receives the input signal from input 714 which has been inverted twice in gates 7124 and 7125, respectively, at its input 743 and receives the P' and G' terms derived in gate 7007 having been inverted by inverters 7122 at its second input 742.

It can be seen that each input path has resulted in two signal inversions, the first being at carry-tree gate 7007 and inverter 7122, respectively, and the second being at inverters 7124 and 7125, respectively. Thus, the two inputs have both been inverted an even number of times and have traversed an even number of logic levels prior to reaching carry-tree gate 7016. Carry-tree gate 7020 receives its input signals respectively from lines 746 and 739. Input line 739 has traversed two inversions, the first at carry-tree gate 7005 and the second at inverters 7116, while the input signal on line 746 has been inverted four times, the first being at the respective carry-tree gates 7001 through 7004, the second being at carry-tree gates 7009 and 7010, the third being carry-tree gate 7013 and the fourth being at inverters 7112. Carry-tree gate 7025 illustrates the carry-tree gate where the inputs have both traversed an odd number of logic levels. Input line 730 has traversed the single logic level at inverters 7121, while input 762 has traversed carry-tree gate 7021, inverters 7126, inverters 7119, carry-tree gate 7011, and carry-tree gates 7005, 7006. In the other branch 746 input to carry-tree gate 7021, the signal has traversed inverters 7112, carry-tree gate 7013, carry-tree gates 7009, 7010, and carry-tree gates 7001, 7002, 7003, 7004.

In addition to providing carry-tree gates where each input either has both odd or both even number of preceding logic levels in order to preserve proper logic sense of the signals, the number of logic levels traversed through the tree structure is limited to six delays. It can be seen that outputs 749 and 734 involve two gate delays, while four gate delays are encountered at outputs 750, 751, 752 and 747. The remaining outputs each traverse six gate delays prior to reaching the output. The maximum loading on a gate has been reduced from six in FIG. 4 to four in FIG. 7.

For a 32-bit design, it is possible to use the principles of the invention to expand the arrangement of FIG. 7. It is seen that, for a 32-bit ALU, $C_{15} = G_{15}'$ OR $P_{15}'C_{IN}$. However, $G_{15}'$ and $P_{15}'$ are available in four gate delays and it takes one gate delay to generate $C_{15}BAR$, FIG. 9A. The $C_{15}BAR$ signal can be used to drive multiple inverters in parallel or a single larger inverter, and these inverters can be used to drive the C for bits 16 through 31. Each inverter has a fanout of 16/X where X is the number of inverters used. Thus, if fur inverters are used, the fanout is four and bits 16 through 31 are ready at the same time as bits 5 through 15, or six delays from the input to the output of the above carry logic circuitry.

Figure 8:
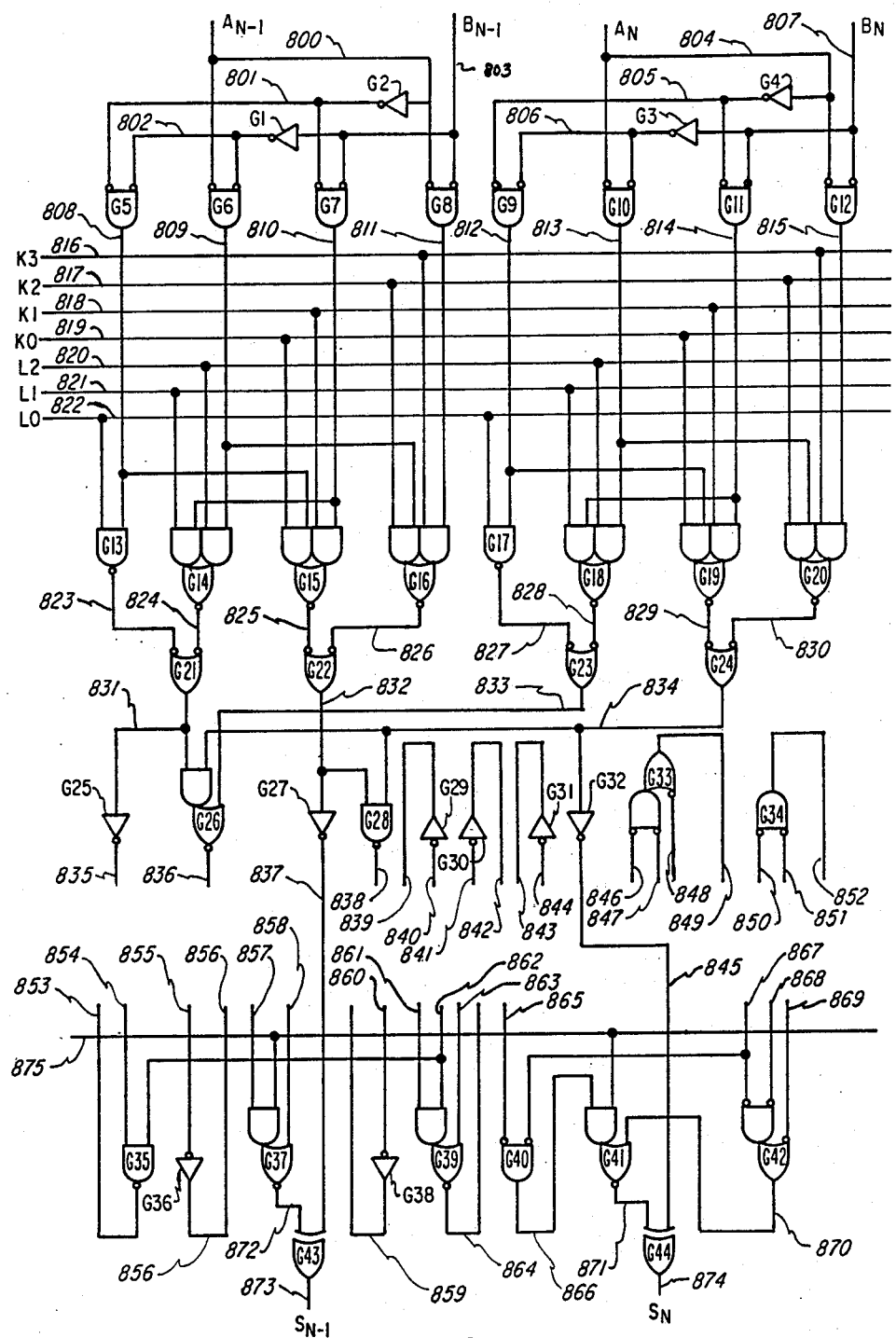
FIG. 8 illustrates circuity for a 2-bit ALU cell.

FIG. 8 illustrates a cell for the ALU which includes the front end, carry propagate portion and the output portion. This cell can be repeated multiple times in the design of an ALU to provide 2 bits of an N bit ALU for each repeat of the cell. Thus, for a 16-bit ALU, the cell would be repeated 8 times.

FIG. 8 illustrates the logic necessary to implement two bits of an ALU which performs all the logic specified in Table 1. Input 800 is the variable $A_{N-1}$. Input 803 is the input variable $B_{N-1}$. Inverter $G_1$ inverts the signal of input 803 to produce $B_{N-1}BAR$ on line 802. Inverter $G_2$ inverts the signal of input 800 to produce $A_{N-1}BAR$ on line 801. Two input NOR gates $G_5$ through $G_8$ produce the outputs $A_{N-1} B_{N-1}$ in $G_5$, $A_{N-1}BAR B_{N-1}$ in $G_6$, $A_{N-1} B_{N-1}BAR$ in $G_7$ and $A_{N-1}BAR B_{N-1}BAR$ in $G_8$. The outputs of gates $G_5$ through $G_8$ are lines 808 through 811, respectively. Input variable $A_N$ is on line 804 and $B_N$ is on line 807. $G_3$ forms a similar function to inverter $G_1$ for $B_N$ and $G_4$ forms a similar function to $G_2$ for $A_N$. NOR gates $G_9$ through $G_{12}$ perform similar functions to $G_5$ through $G_8$, respectively. The outputs of gates $G_9$ through $G_{12}$ are on lines 812 through 815, respectively. Lines 816 through 819 are the control signals $K_3$ through $K_0$, respectively. Line 820 is $L_2$, line 821 is $L_1$ and line 822 is the control input $L_0$. The K inputs control which logic function is used in generating the P or propagate terms. The L inputs determine what logic function is used to specify the G or generate terms. Two input NAND $G_{13}$, dual two input AND/NOR $G_{14}$ and two input NAND $G_{21}$ provide the $G_{N-1}$ term which is:

$$G_{N-1} = L_0 A_{N-1} B_{N-1} \text{ OR } L_1 A_{N-1} B_{N-1}BAR \text{ OR } L_2 A_{N-1}BAR B_{N-1}$$

This term is produced on line 831 which is the output of gate $G_{21}$.

Similarly, dual two input AND/NOR gates $G_{15}$ and $G_{16}$ and two input NAND $G_{22}$ provide the logic function for $P_{N-1}$ which is:

$$P_{N-1} = K_0 A_{N-1} B_{N-1} \text{ OR } K_1 A_{N-1} B_{N-1}BAR \text{ OR } K_2 A_{N-1}BAR B_{N-1} \text{ OR } K_3 A_{N-1}BAR B_{N-1}BAR$$

The output of $G_{22}$ is on line 832. Gates $G_{17}$, $G_{18}$ and $G_{23}$ act in a similar manner to gates $G_{13}$, $G_{14}$ and $G_{21}$ to produce $G_N$ at the output of gate $G_{23}$ on line 833. Gates $G_{19}$, $G_{20}$ and $G_{24}$ act in a similar manner to gates $G_{15}$, $G_{16}$ and $G_{22}$ to produce the output $P_N$ on line 834 at the output of gate $G_{24}$. Inverter $G_{25}$ inverts the signal $G_{N-1}$ on 831 to produce $G_{N-1}BAR$ on line 835. AND/NOR gate $G_{26}$ produces $G_N'BAR$ on the output line 836. The AND inputs to gate $G_{26}$ are $G_{N-1}$, line 831 and 834 $P_N$. The NOR input to AND/NOR gate $G_{26}$ is $G_N$ on line 833. The output of gate $G_{26}$ is $G_N'BAR$ on line 836. Inverter $G_{27}$ produces $P_{N-1}BAR$ on its output line 837. NAND gate $G_{28}$ produces $P_N'BAR$ on its output 838. NAND gate $G_{28}$'s two inputs are $P_{N-1}$ and $P_N$. Inverters $G_{29}$, $G_{30}$ and $G_{31}$ are totally individually accessible inverters and complex gate $G_{33}$ is a totally individually accessible OR/NAND gate. Gate $G_{34}$ is a two input NOR gate which is totally individually accessible, and inverters $G_{36}$ and $G_{38}$ are totally individually accessible. NAND gate $G_{35}$ and complex AND/NOR gate $G_{39}$ are individually accessible and include totally individually accessible inputs and outputs but for common input line 862. Line 862 is an input to NAND gate $G_{35}$ and to an AND input of gate $G_{39}$. The output of inverter $G_{27}$, $P_{N-1}BAR$ goes directly to one input of EXCLUSIVE OR $G_{43}$ whose output 873 produces $S_{N-1}$. Similarly, the output of inverter $G_{32}$, $P_NBAR$ goes directly to one input of EXCLUSIVE OR $G_{44}$ whose output is 874 which is used to produce $S_N$.

The carry input C goes to one AND input of AND/NOR gates $G_{37}$ and $G_{41}$. The output of $G_{37}$ goes to the other input of EXCLUSIVE OR gate $G_{43}$. The output of AND/NOR gate $G_{41}$ is 871 and it goes to the other input of EXCLUSIVE OR $G_{44}$. The other two inputs to AND/NOR gate $G_{37}$ are individually accessible. NOR gate $G_{40}$ output 866 goes to the other AND input of AND/NOR gate $G_{41}$. One input of NOR gate $G_{40}$ is individually accessible, the other input is individually accessible and common to the OR input of OR/NAND gate $G_{42}$. The other two inputs to OR/NAND gate $G_{42}$ are individually accessible. The output 870 of gate $G_{42}$ goes to the NOR input of AND/NOR gate $G_{41}$. It should be noted that common, individually accessible gates could also be made individually accessible and not common.

The ALU of FIG. 8 is designed to provide all the logic necessary to implement up to a 32-bit ALU with no additional logic required. Gates $G_1$ to $G_{24}$ generate the P and G terms as defined in Table 1. The implementation chosen provides a transistor stack height, number of series transistors, of two transistors maximum and a fanout of four maximum. This implementation in CMOS can be laid out in five rows of transistor pairs:

$G_1$ through $G_{13}$ and $G_{17}$ ... in row 1,
$G_{14}$ through $G_{16}$ and $G_{18}$ through $G_{20}$ in row 2,
$G_{21}$ through $G_{34}$ ... in row 3,
$G_{35}$ through $G_{44}$ *(excluding row 5) ... in row* 4, and
Inverters $G_{36}$ and $G_{38}$ and the output inverters of $G_{43}$ and $G_{44}$ ... in row 5.

This makes rows 1 through 4 equal in the number of transistors at 24 transistor pairs per row. Connections 835 through 856 and 859 through 864 provide access to all the signals and the logic necessary to implement the carry-tree structure shown in FIG. 7 and provide access to logic driving the C line shown on FIG. 8. Line C in FIG. 8 for bits 0 through 15 is driven from a buffered form of $C_{IN}$. The line C in FIG. 8 for bits 16 through 31 is driven as illustrated in FIG. 9A.

With respect to the cell's front end, there are many alternative implementations which will perform the desired logic function, i.e., providing the P and G terms. The embodiment illustrated illustrates gates $G_1$ to $G_{24}$ as the front end. Alternatives to the illustrated design include replacing gates $G_{14}$ through $G_{16}$ and $G_{18}$ through $G_{20}$ with two input NAND gates (two per gate replaced) and replacing $G_{21}$ and $G_{23}$ with three input NAND gates and replacing $G_{22}$ and $G_{24}$ with four input NAND gates. Alternatively, the NAND gates replacing $G_{13}$ through $G_{20}$ could be three input NAND gates, thus eliminating $G_5$ through $G_{12}$ and the associated level of logic.

Figure 9A:
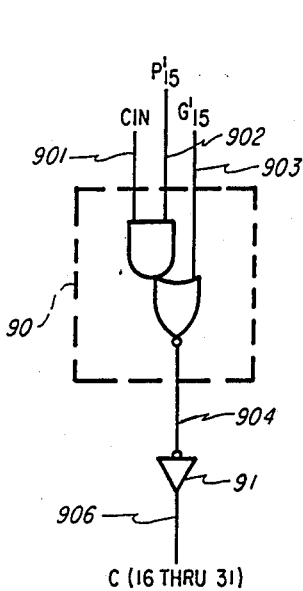
FIG. 9A illustrates the logic for generating the carry required into bits 16 through 31.
Figure 9B:
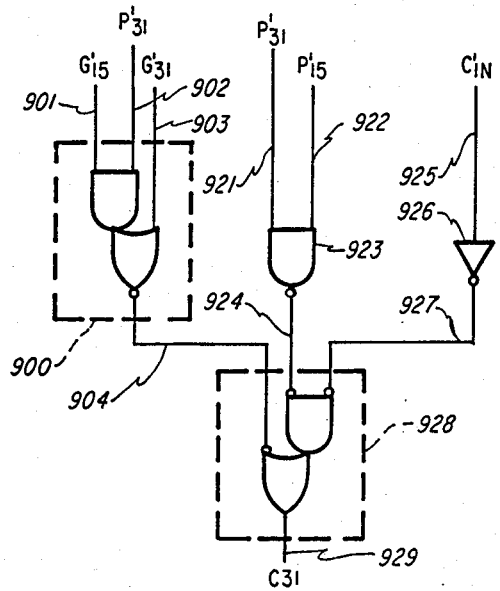
FIG. 9B illustrates the logic required to provide the carry-out of bit 31.
Figure 16A:
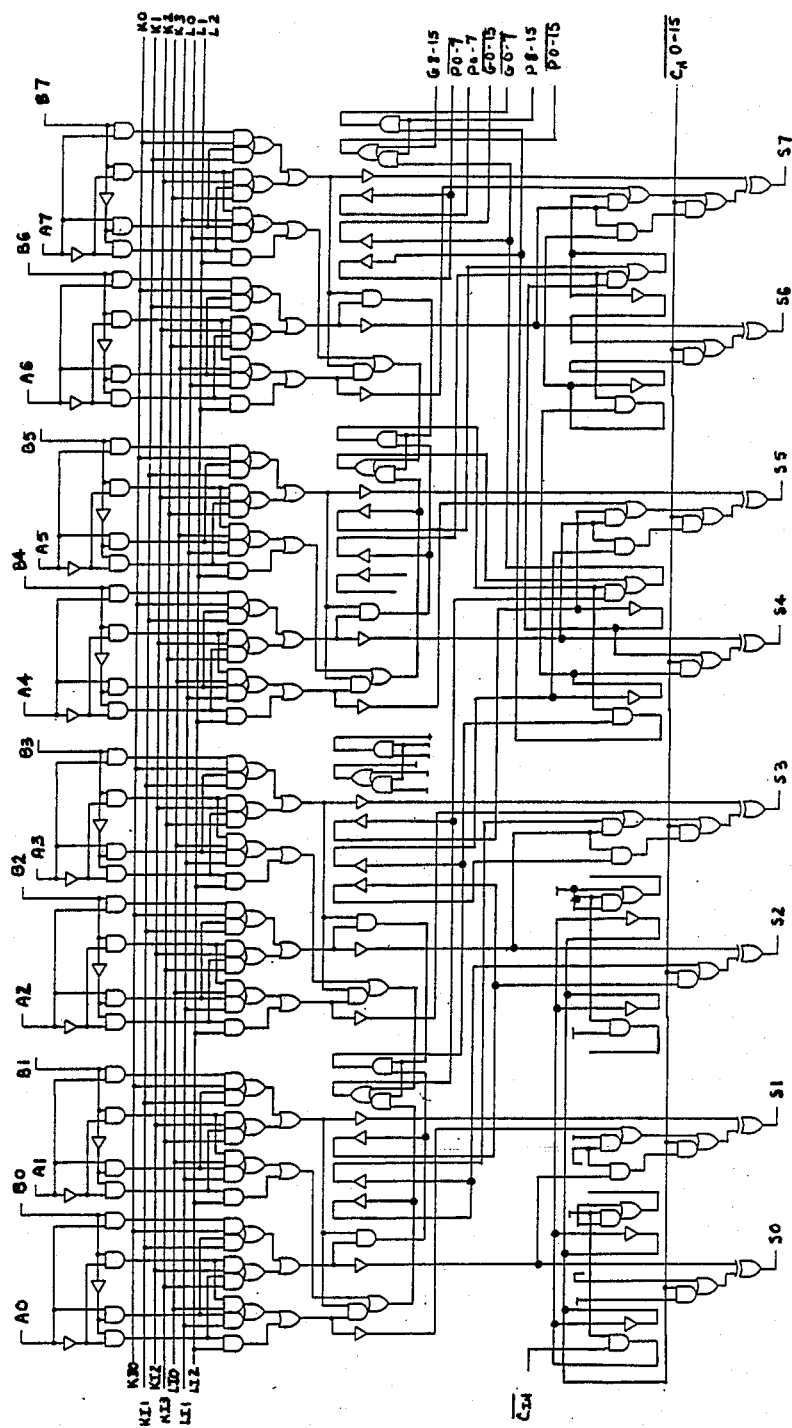
FIGS. 16A through 16D illustrate a 32-bit ALU circuit designed according to the invention.
Figure 16B:
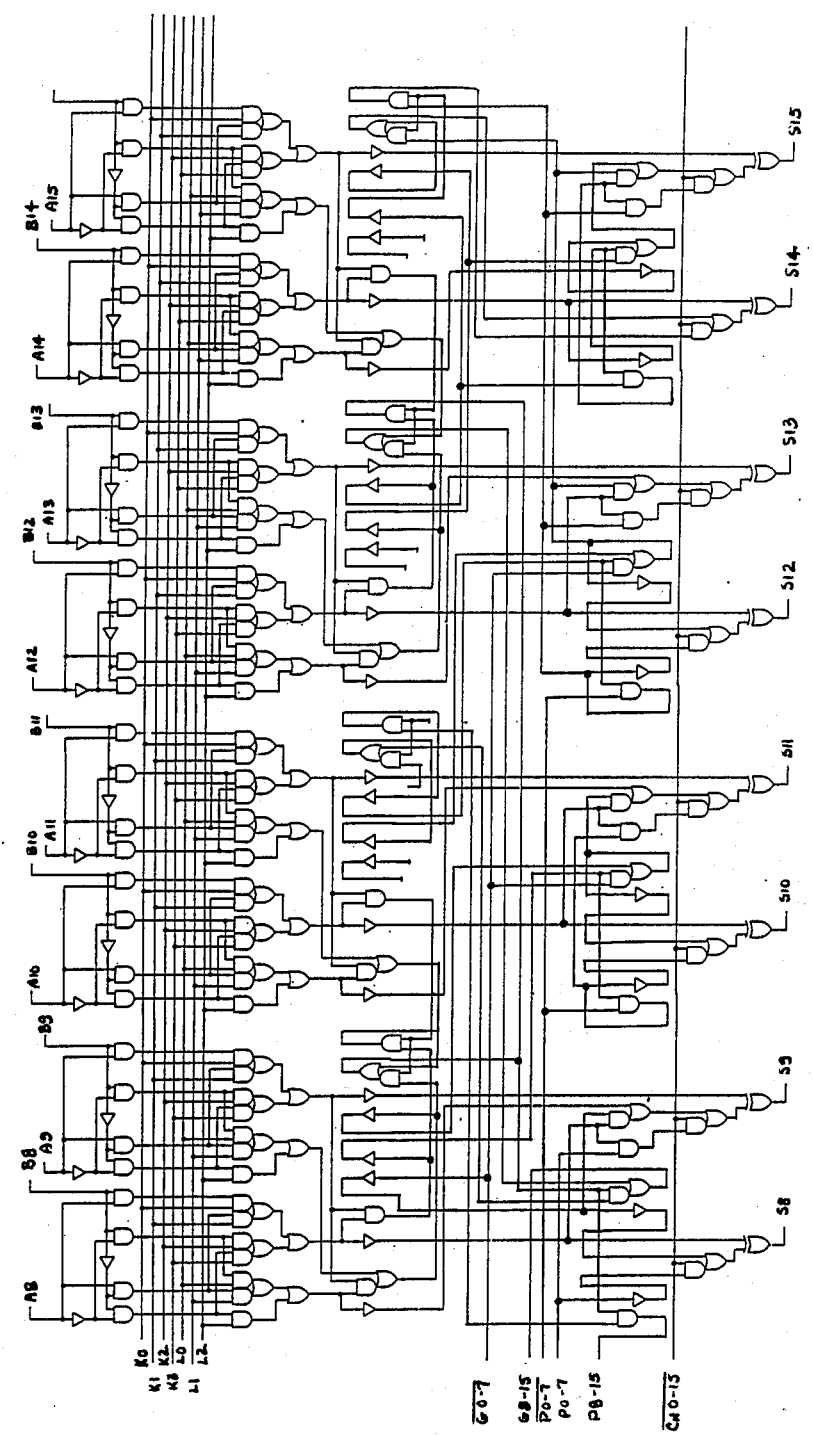
Figure 16C:
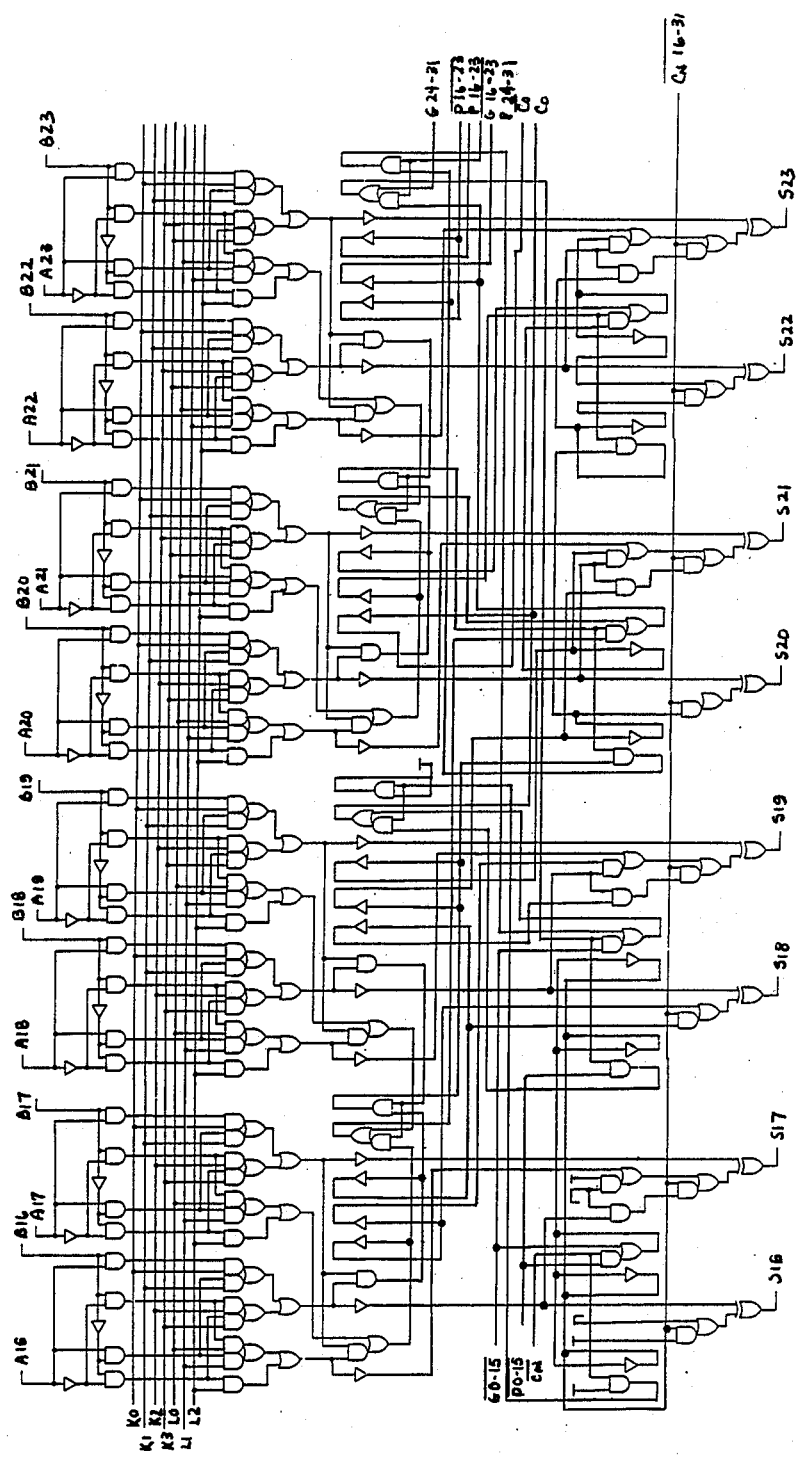
Figure 16D:
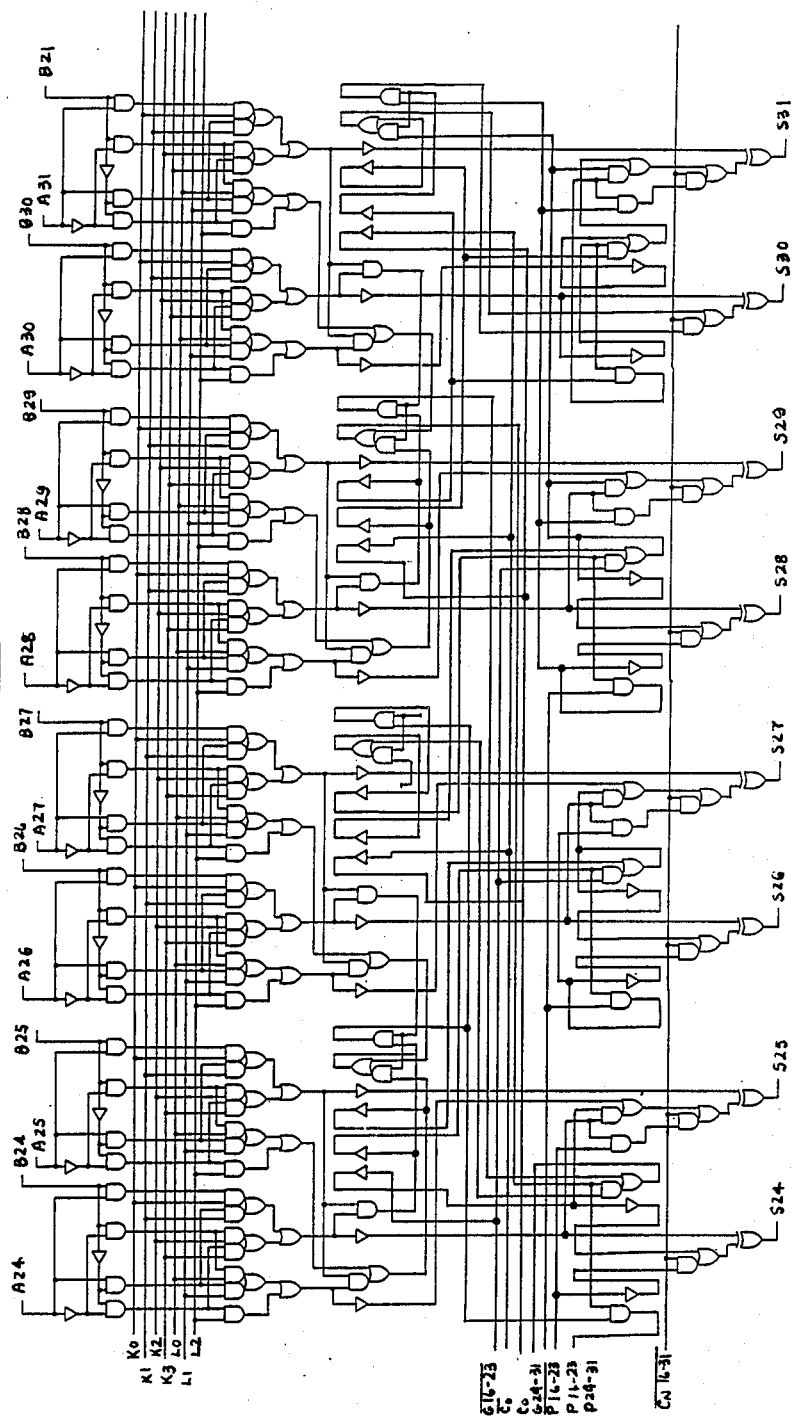

FIG. 9A shows how the carry is generated for the upper 16 bits of a 32-bit- ALU illustrated in FIGS. 16C and 16D, while FIG. 9B illustrates the circuitry for providing carry-out from bit 31 which is the last carry bit. This carry-out signal provided by the circuitry of FIG. 9B is the signal which would be provided to the carry line for higher order bits in the event that an ALU having greater than 32 bits were being implemented. Alternatively, the carry-in for bits higher than bit 31 could be generated by P and G terms in order to keep the number of delays to a minimum such as was done for the second 16 bits in the implementation illustrated.

Figure 10:
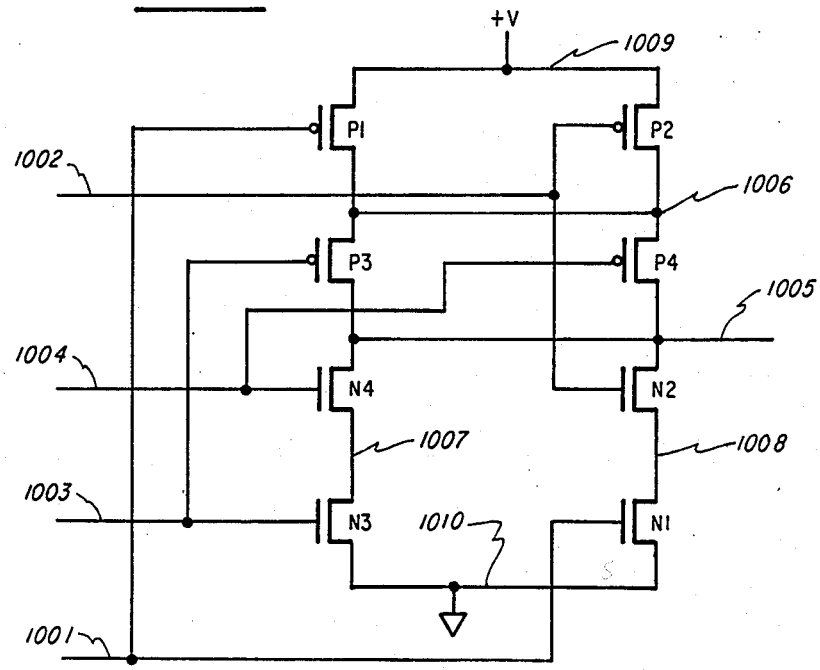
FIG. 10 is a schematic for a dual two input CMOS AND/NOR gate.

FIG. 10 is the schematic for a four input dual two input AND/NOR gate such as used in gates $G_{14}$ through $G_{16}$ or $G_{18}$ through $G_{20}$ of FIG. 8. This structure requires a maximum of two series transistors to be traversed from the output to either supply when the output is either in a logic low or high state.

Figure 11:
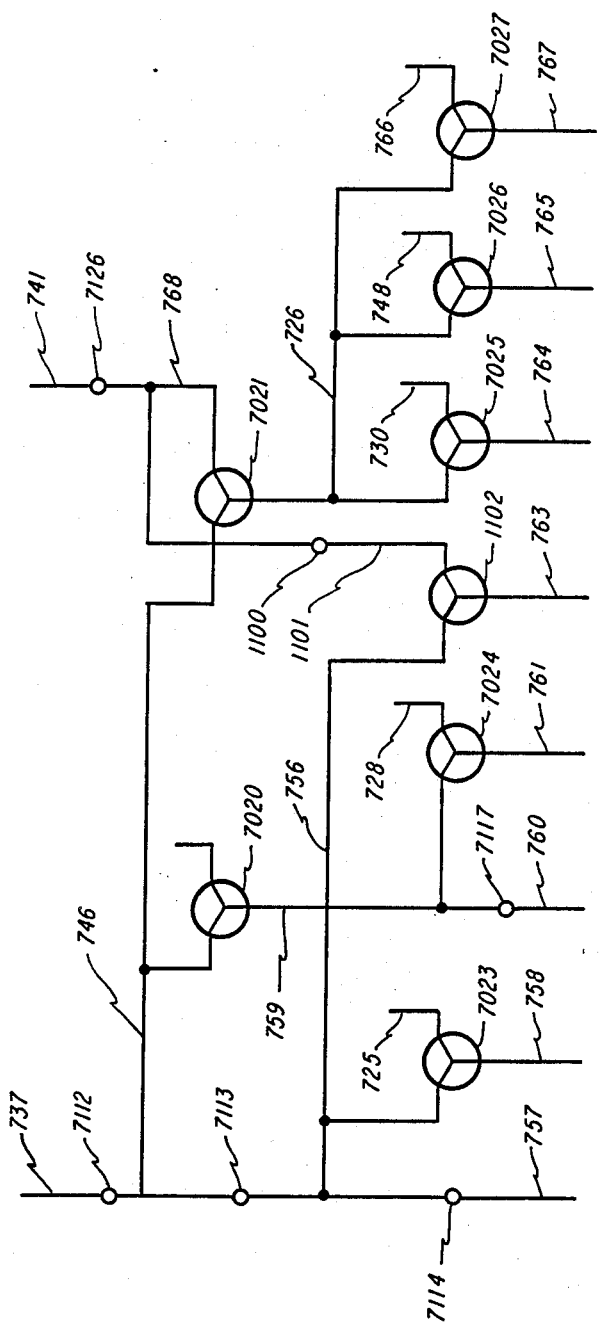
FIG. 11 illustrates an improved carry-tree circuit implementation.

FIG. 11 shows an improvement to that shown in FIG. 7. The maximum loading in FIG. 7 is a fanout of four for gate 7021. The improvement in FIG. 11 reduces the fanout to a maximum of three. Numbering in FIG. 11 is the same as in FIG. 7 for corresponding unchanged portions. Changed portions carry new line and device designations. Device inverter 7120 in FIG. 7 is eliminated in FIG. 11. This reduces the load on line 762 to three loads, hence the maximum fanout on carry gate 7021 is a fanout of three. Line 768 in FIG. 7 has only one load, carry gate 7021. In FIG. 11 it has two loads, the input to carry gate 7021 and the input to inverters 1100. The output of the new devices 1100 drive line 1101 which is the input to a new carry gate 1102 whose output drives line 763. The other input to carry gate 1102 is from inverters 7113 whose output is line 756. This increases the loading on inverter 7113 from two in FIG. 7 to three in FIG. 11. Thus, it can be seen that the improvement reduces the maximum fanout in the carry-tree structure from a fanout of four to a fanout of three but requires one additional carry-tree gate.

Figure 12:
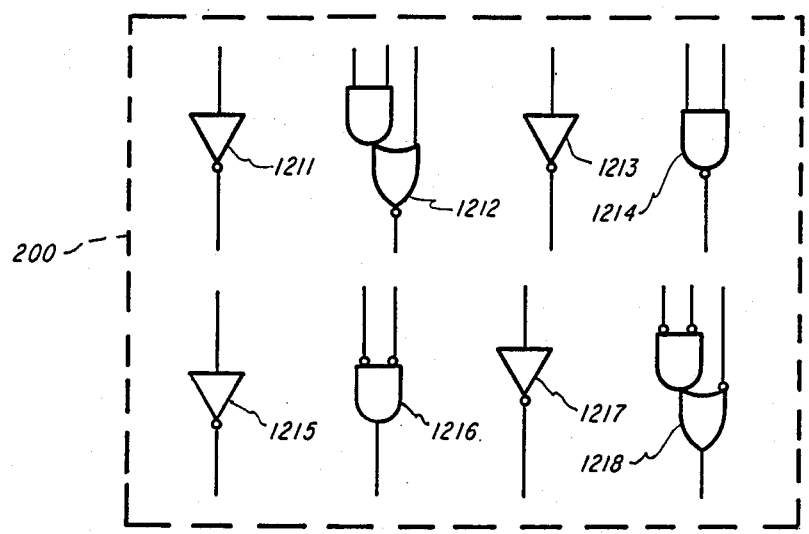
FIG. 12 illustrates the logic required for a 1-bit carry-tree cell.

FIG. 12 shows a 1-bit carry-tree cell, cell 1200. This cell contains four totally individually accessible inverters 1211, 1213, 1215 and 1217 and one totally individually accessible AND/NOR gate 1212, one totally individually accessible NAND gate 1214, one totally individually accessible NOR gate 1216, and one totally individually accessible OR/NAND gate 1218. This cell contains all the logic necessary for a 1-bit carry-tree structure.

Figure 13:
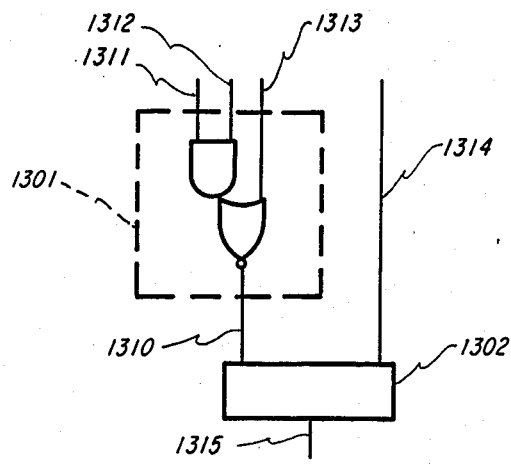
FIG. 13 illustrates the logic for a 1-bit ALU output cell.

FIG. 13 contains a 1-bit cell which can be used for the output portion of an ALU. This cell contains two gates, 1301 which is a AND/NOR gate with three individually accessible input lines 1311, 1312 to the AND portion and 1313 to the NOR portion of AND/NOR gate 1301. The output of 1301 is on line 1310 which goes to the output EXCLUSIVE OR gate or EXCLUSIVE NOR gate 1302. The other input to the output EXCLUSIVE OR gate or EXCLUSIVE NOR gate 1302 is individually accessible input line 1314. The output of 1302 is line 1315. 1302 could be either an EXCLUSIVE OR gate or an EXCLUSIVE NOR gate depending on the polarity or sense chosen for the signal on line 1314. For example, assuming that the sense of the input lines 1311 through 1314 are all positive and the desired sense of the output signal 1315 were to be positive, then gate 1302 would be an EXCLUSIVE NOR gate. If, however, the sense of input 1314 were inverted, then an EXCLUSIVE OR gate would be used for gate 1302 to again produce a positive sense output on 1315.

Figure 14:
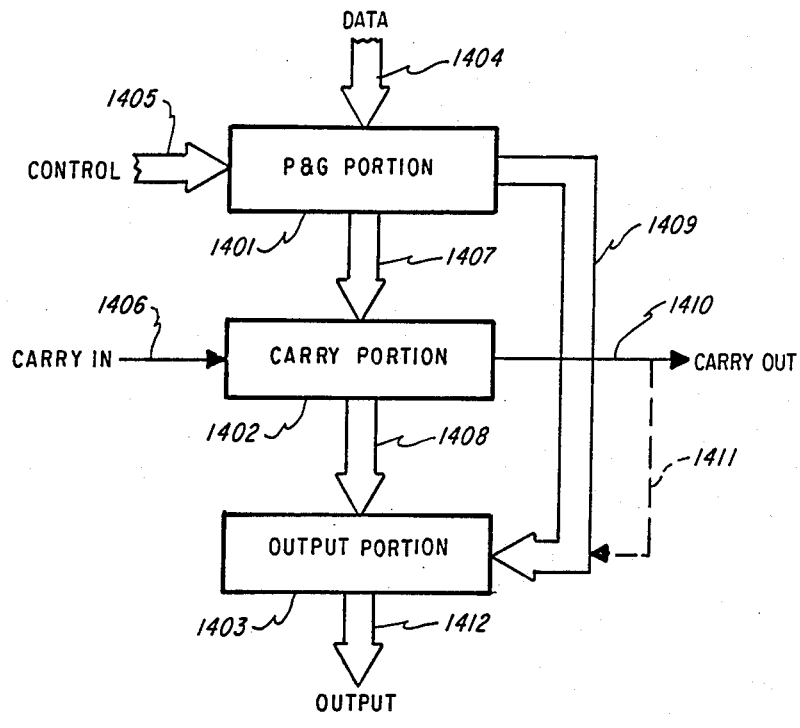
FIG. 14 illustrates in block diagram form one structural implementation of the invention.

FIG. 14 is a block diagram of the functional blocks of an individual cell for use in implementing a multicell ALU. Control signals are provided to input 1405, and data input is provided through input 1404 to P and G portion 1401, where P and G terms are generated and provided to a carry portion 1402 through data path 1407 and to an output portion 1403 through data path 1409. A carry-in signal is provided to the carry portion through data path 1406 and a carry-out is provided from the carry portion through data path 1410. The carry signal provided from carry portion 1402 through data path 1408 is received at output portion 1403, where a data output 1412 is provided. The carry-out could be provided to the output portion through 1411.

Figure 15:
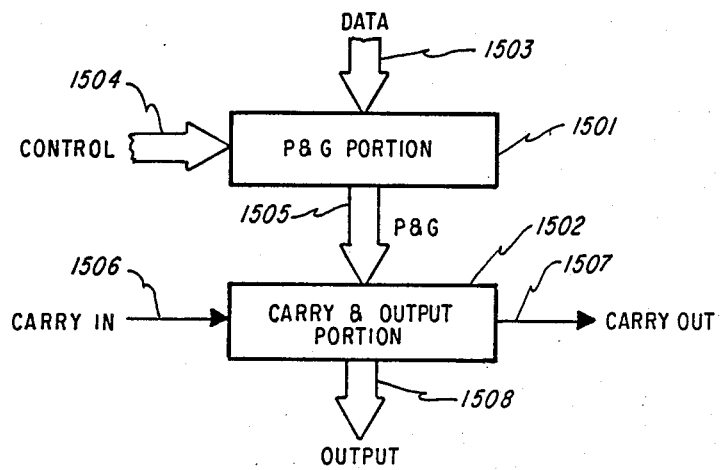
FIG. 15 illustrates in block diagram form another structural implementation of the invention.

FIG. 15 illustrates a simplified block diagram illustrating data input 1503 and control input 1504 to P and G portion 1501. P and G terms are provided through data path 1505 from the P and G portion to carry and output portion 1502. A carry-in signal is provided through data path 1506 to the carry and output portion, and an output is provided through output 1508. A carry-out through the highest order bit level is provided through data path 1507.

FIGS. 16A, B, C and D illustrate a full logic schematic of a 32-bit ALU fabricated from 16 repeats of the 2-bit cell structure illustrated in FIG. 8. The interconnect illustrated in FIGS. 16A–D implements the carry structure illustrated in FIG. 7. The maximum fanout of four provided in FIG. 16 could be modified as illustrated in FIG. 11 to reduce the maximum fanout in the carry-tree structure to three.

Counting all of the gates in the foregoing implementation as having one gate delay except for the EXCLUSIVE OR which has two gate delays, the total delays encountered in the circuit is as follows:

C to S—3 delays maximum
L to S—11 delays maximum
K to S—11 delays maximum
carry logic delay—6 delays maximum
$C_{IN}$ to S—5 delays maximum
P and G logic—4 delays maximum Thus, since C to S, carry logic delay and P and G logic can be serially implemented, the maximum delay which can be encountered in the use of the ALU described is 13 delays.

The number of bits combined at each stage in the carry-tree logic is optimized when two inputs are provided. Notwithstanding that this results in a larger number of stages required to implement a circuit, a three input carry-tree implementation, for instance, results in excessive stack height. The additional stack height results in a slower time constant, due to the increased resistance by a factor of 3 to 2.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An arithmetic logic unit for executing a selected arithmetic operation on first and second digital code signals comprising:

a front end portion having a first plurality of input terminals to which respective bit signals of said first digital code signal are applied and a second plurality of input terminals to which respective bit signals of said second digital code signal are applied, said front end portion including arithmetic operation defining control lines and means for generating propagate and generate term signals for the respective bit positions of said digital code signals in accordance with logic signals applied to said arithmetic function defining control lines;

a carry propagation portion having a plurality of inputs coupled to receive from said front end portion the propagate and generate term signals for said respective bit positions, said carry propagation portion comprising carry propagation logic circuits and inverter circuits interconnected in a tree structure between said plurality of inputs and a plurality of outputs and providing at said plurality of outputs respective carry propagation signals associated with said respective bit positions; and an output portion, coupled to said carry propagation portion and to said front end portion, and including means for logically combining propagate and generate signals with carry propagation signals to derive an arithmetic operation output code representative of an arithmetic operation executed on said first and second digital code signals.

2. An arithmetic logic unit according to claim 1, wherein said carry propagation logic circuits are interconnected such that the maximum loading of any carry propagation logic circuit by other carry propagation logic circuits connected thereto is three.

3. An x-bit arithmetic logic unit cell through which an n-bit arithmetic logic unit for executing a selected arithmetic operation having a tree-structured carry may be configured by interconnecting n repeats of said x-bit cell structure, said cell comprising:

first means for receiving x-bit input signals and generating therefrom propagate and generate term signals associated with said x-bits and including arithmetic operation defining control lines and means for generating propagate and generate term signals for the said x-bit input signals in accordance with logic signals applied to said arithmetic function defining control lines; and second means for receiving propagate and generate term signals and a carry signal and producing therefrom x-bit arithmetic operation representative signals, said second means including a carry propagation circuit formed of plurality of interconnected carry tree gate circuits and inverter circuits.

4. An x-bit arithmetic logic unit cell according to claim 3, wherein said x-bit cell is a two-bit cell and said x-bit input signals for said cell comprise immediately successive bit signals $A_N$ and $A_{N-1}$ and $B_N$ and $B_{N-1}$, for first and second digital input signals A and B, respectively, and said first means generates propagate term signal $P_{N-1}$ and $P_N$ and generate term signals $G_{N-1}$ and $G_N$, and said second means generates propagate term signals $P_{N-1}BAR$, and $P_N BAR$ and generate term signals $G_{N-1}BAR$, $G_N BAR$, in the course of generating a further carry signal and said x-bit arithmetic operation representative signals.

5. An x-bit arithmetic logic unit cell according to claim 4, wherein said second means includes means for providing individual access to said propagate and generate term signals $G_{N-1}BAR$, $G_N'BAR$, and $P_N'BAR$.

6. An x-bit arithmetic logic unit cell according to claim 4, wherein said plurality of carry tree gate circuits and inverter circuits are comprised of inverting CMOS logic and are interconnected such that the maximum fanout of any carry tree gate circuit for implementing a 32-bit arithmetic logic unit by other carry tree gate circuits connected thereto is three.

7. An x-bit arithmetic logic unit cell according to claim 6, wherein said second means comprises a first carry-tree gate providing an AND/NOR function and a second carry-tree gate providing an OR/NAND function, said first carry-tree gate providing an AND/NOR function and a second carry-tree gate providing an OR/NAND function, said first carry-tree gate connected to receive said $F_{N-1}$ term and $P_N$ term at the AND inputs and to receive said $G_N$ term at a NOR imput, and including means for providing individual access to imputs of said second carry-tree gate.

8. An x-bit arithmetic logic unit cell according to claim 7, wherein said second means further comprises a first output portion and a second output portion, each output portion comprising an AND/NOR gate having a first AND input connected to receive a carry-in signal and having its output connected to an output gate.

9. An x-bit arithmetic logic unit cell according to claim 8, wherein said output gate comprises and EXCLUSIVE OR gate.

10. An x-bit arithmetic logic unit cell according to claim 8, wherein said output gate comprises an EXCLUSIVE NOR gate.

11. An x-bit arithmetic logic unit cell according to claim 9, wherein said $P_N$ term signal is provided to an inverter to generate a $P_N$BAR signal and said $P_N$BAR signal is supplied to said output gate of said second output portion at an EXCLUSIVE OR input.

12. An x-bit arithmetic logic unit cell according to claim 8, wherein said $P_{N-1}$ and said $P_N$ term signals are coupled to first and second inputs of a first NAND gate in said second means, and including means for providing individual access to the output of said first NAND gate.

13. An x-bit arithmetic logic unit cell according to claim 12, further comprising a first NOR gate having an output connected to a second input of said AND/NOR gate of said second output portion.

14. An x-bit arithmetic logic unit cell according to claim 8, further comprising a second AND/NOR gate having first and second AND inputs and a NOR input and having an individually accessible output, said first AND input being individually accessible, and a second NAND gate having a first individually accessible input and having and individually accessible output, and having a second input connected to said second input of said second AND/NOR gate, said connection of said second NAND input and said second input of said second AND/NOR gate being individually accessible.

15. An x-bit arithmetic logic unit cell according to claim 14, further comprising a second OR input and a NAND input, said second OR input and said NAND input of said second OR/NAND gate being individually accessible, and a first NOR gate having first and second NOR inputs and a NOR output, said NOR output connected to said first AND input of said AND/NOR gate of said second output portion of said second means, said first NOR input being individually accessible and said second NOR input having an individually accessible connection to said first OR input of said second OR/NAND gate.

16. An x-bit arithmetic logic unit cell according to claim 15, further comprising a second NOR gate having a first and second individually accessible inputs and an individually accessible output.

17. An x-bit arithmetic logic unit cell according to claim 16, further comprising first, second and third inverters having individually accessible inputs and outputs.

18. An x-bit arithmetic logic unit cell according to claim 17, further comprising a fourth inverter having an individually accessible input and an individually accessible output.

19. An x-bit arithmetic logic unit cell according to claim 18, further comprising a fifth inverter having an individually accessible input and an individually accessible output.

20. An n-bit arithmetic logic unit cell through which an m-bit arithmetic logic unit having a tree-structured carry may be configured by interconnecting m/n repeats of said n-bit cell structure, said cell comprising:
first means for receiving n-bit input signals and including arithmetic operation defining control lines for generating propagate and generate term signals associated with said n-bits in accordance with logic signals applied to said arithmetic function defining control lines; and
second means for receiving propagate and generate term signals and a carry signal and producing therefrom n-bit arithmetic logic unit signals, said second means including a carry propagation circuit formed of plurality of interconnected carry tree gate circuits and inverter circuits, each of which is individually accessible.

21. An n-bit arithmetic logic unit cell according to claim 20, wherein said second means comprises first, second, third and fourth totally individually accessible inverters.

22. An n-bit arithmetic logic unit cell according to claim 21, wherein said second means comprises a fifth totally individually accessible inverter.

23. An n-bit arithmetic logic unit cell according to claim 22, wherein said second means comprises a sixth inverter having a $G_{N-1}$ term signal coupled to its input and having its output individually accessible.

24. An n-bit arithmetic logic unit cell according to claim 20, said cell is a two-bit cell, and wherein said P and G term signals include $P_{N-1}$, P, $G_{N-1}$ and $G_N$ signals, and wherein said $G_{N-1}$ and $P_N$ term signals are provided supplied to respective AND inputs of a first AND/NOR gate and said $G_N$ term signal is applied to the NOR input of said first AND/NOR gate, and wherein the output of said first AND/NOR gate is individually accessible, said $G_{N-1}$ term signal is coupled to the input of a first inverter and the output of said first inverter is individually accessible, said $P_{N-1}$ term signal is provided to a first input of a first NAND gate and to the input of a second inverter, and said $P_N$ term is provided to a second input of said first NAND gate and to the input of a third inverter, the output of said first NAND gate being individually accessible, said totally individually accessible carry-tree gate comprise, a first OR/AND gate, said plurality of totally individually accessible inverters comprises first, second, third and fourth and fifth inverters, further including a totally individually accessible NOR gate, a second AND/NOR gate having first and second AND inputs, a NOR input and an output, said first AND input, said NOR input and said output being individually accessible, a second NAND gate having first and second inputs and an output, said first input and said output being individually accessible and said second input being connected to said second AND input of said second AND/NOR gate at an individually accessible node, a second AND/NOR gate having first and second AND inputs and a NOR input and an output, said first AND input and said NOR input being individually accessible, said second AND input connected to said carry-in line, a first EXCLUSIVE OR gate having first and second inputs and an output, said first input connected to said output of said second AND/NOR gate and said second input connected to the output of said second inverter, said output providing a $SUM_{N-1}$ term, a third AND/NOR gate having first and second AND inputs and a NOR input and an output, said second AND input connected to said carry line, a second NOR gate having first and second inputs and an output, said first input being individually accessible and said output being connected to said first input of said third AND/NOR gate, a second OR/NAND gate having first and second OR inputs and a NAND input and an output, said second OR input and said NAND input being individually accessible and said first OR input being connected to said second NOR input of said second NOR gate at an individually accessible node, said output of said second OR/NAND gate connected to said NOR input of said third AND/NOR gate and a second EXCLUSIVE OR gate having first and second inputs and an output, said first input connected to said output of said third AND/NOR gate said second input connected to said output of said third inverter and said output providing a $SUM_N$ term signal.

25. An arithmetic logic unit for executing a selected arithmetic operation on first and second digital code signals comprising:

a plurality of arithmetic logic unit cells each of which contains circuitry for implementing one bit of said arithmetic logic unit and includes a front end portion, a carry propagation portion and an output portion, said arithmetic logic unit cells being interconnected so that their front end portions are coupled to receive respective bit signals of said first digital code signal and respective bit signals of said second digital code signal, said front end portions including arithmetic operation defining control lines and means for generating propagate and generate term signals for the respective bit positions of said digital code signals in accordance with logic signals applied to said arithmetic function defining control lines;

said carry propagation portions having a plurality of inputs coupled to receive from said front end portion the propagate and generated term signals for said respective bit positions, and comprising carry propagation logic circuits and inverter circuits interconnected in a tree structure between said plurality of inputs and a plurality of outputs and providing at said plurality of outputs respective carry propagation signals associated with said respective bit positions; and said output portions being coupled to said carry propagation portions and to said front end portions, and including means for logically combining propagate and generate signals with carry propagation signals to derive and arithmetic operation representative output code representative of an arithmetic operation on said first and second digital code signals.

26. An arithmetic logic unit according to claim 25, wherein said output portion comprises an AND/NOR gate driving an EXCLUSIVE OR gate.

27. An arithmetic logic unit according to claim 25, wherein said output portion comprises an AND/NOR gate driving an EXCLUSIVE NOR gate.

28. An arithmetic logic unit according to claim 27, a generated propagate signal from said propagate and generate portion is coupled to one input of said EXCLUSIVE NOR gate.

29. An arithmetic logic unit according to claim 25, wherein said carry propagation logic circuits are interconnected such that the maximum loading of any carry propagation logic circuit by other carry propagation logic circuits connected thereto is three.

30. An arithmetic logic unit according to claim 25, wherein said arithmetic logic unit comprises a 32 bit arithmetic logic unit in which output portions for bits 0-15 are coupled to receive carry propagation signals from said carry propagation portions and a carry-in signal and output portions for bits 16-31 are coupled to receive carry propagation signals from said carry propagation portions and a carry signal from bit 15.

31. A method of implementing an m-bit arithmetic logic unit having a tree-structured carry comprising the steps of:

(a) providing, in a semiconductor substrate, a plurality of n-bit arithmetic logic unit cells, each cell containing a front end portion having a first plurality of input terminals to which respective bit signals of a first digital code signal are to be applied and a second plurality of input terminals to which respective bit signals of a second digital code signal are to be applied, said front end portion including arithmetic operation defining control lines and means for generating propagate and generate term signals for the respective bit positions of said digital code signals in accordance with logic signals applied to said arithmetic function defining control lines, a carry propagation portion having a plurality of inputs coupled to receive from said front end portion the propagate and generate term signals for said respective bit positions, said carry propagation portion comprising carry propagation logic circuits and inverter circuits capable of being interconnected in a tree structure between the plurality of inputs of the carry propagation portions of said plurality of cells and a plurality of outputs thereof and providing at said plurality of outputs respective carry propagation signals associated with said respective bit positions, and an output portion, coupled to said carry propagation portion and to said front end portion, and including means for logically combining propagate and generate signals with carry propagation signals to derive arithmetic logic operation representative output bit values representative of the execution of an arithmetic logic operation of the respective bit values for said bits positions of said first and second digital code signals; and (b) interconnecting selected ones of said carry propagation logic circuits and said inverter circuits of said cells in a tree structure between the plurality of inputs and the plurality of outputs of said carry propagation portions, so as to provide at outputs thereof said respective carry propagation signals associated with said respective bit positions, whereby the output codes representative of the execution of an arithmetic logic operation on said first and second code signals.

* * * * *